(12) United States Patent
Shimakawa

(10) Patent No.: US 10,432,744 B2
(45) Date of Patent: Oct. 1, 2019

(54) INFORMATION PROCESSING APPARATUS, INFORMATION PROCESSING SYSTEM, AND INFORMATION PROCESSING METHOD

(71) Applicant: Sony Corporation, Tokyo (JP)

(72) Inventor: Masato Shimakawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 746 days.

(21) Appl. No.: 14/383,910

(22) PCT Filed: Jan. 25, 2013

(86) PCT No.: PCT/JP2013/000385
§ 371 (c)(1),
(2) Date: Sep. 9, 2014

(87) PCT Pub. No.: WO2013/145516
PCT Pub. Date: Oct. 3, 2013

(65) Prior Publication Data
US 2015/0373134 A1      Dec. 24, 2015

(30) Foreign Application Priority Data

Mar. 27, 2012   (JP) ................. 2012-070842

(51) Int. Cl.
*H04L 29/08*   (2006.01)
(52) U.S. Cl.
CPC ............ *H04L 67/28* (2013.01); *H04L 67/142* (2013.01); *H04L 67/145* (2013.01)
(58) Field of Classification Search
USPC ...................................................... 709/219
See application file for complete search history.

(56) References Cited

U.S. PATENT DOCUMENTS

| 2002/0032761 A1* | 3/2002 | Aoyagi ................. H04L 12/462 709/223 |
| 2007/0058599 A1* | 3/2007 | Harsch .................... H04L 69/16 370/338 |

(Continued)

FOREIGN PATENT DOCUMENTS

| JP | 2008-293511 A | 12/2008 |
| JP | 2009-232358 A | 10/2009 |

(Continued)

OTHER PUBLICATIONS

U.S. Appl. No. 14/383,585, filed Sep. 8, 2014, Shimakawa.
U.S. Appl. No. 14/383,929, filed Sep. 9, 2014, Shimakawa.

*Primary Examiner* — Sargon N Nano
*Assistant Examiner* — Christopher B Robinson
(74) *Attorney, Agent, or Firm* — Chip Law Group

(57) ABSTRACT

An information processing apparatus includes a communication unit and a controller. The communication unit is capable of communicating with another information processing apparatus via a relay server in a network. The controller is capable of obtaining communication environment information indicating a communication environment of the communication unit, the communication environment information including attribute information on a communication relay apparatus relaying communication between the communication unit and the relay server. Further, the controller is capable of calculating a sending interval to send maintenance signals to maintain connection with the relay server based on the obtained communication environment information. Further, the controller is capable of controlling the communication unit to send the maintenance signals to the relay server at the calculated sending interval.

11 Claims, 25 Drawing Sheets

(56) References Cited

U.S. PATENT DOCUMENTS

| | | | |
|---|---|---|---|
| 2007/0097990 A1* | 5/2007 | Ozaki | H04L 29/06027 370/395.52 |
| 2007/0214256 A1* | 9/2007 | Castaneda | H04L 67/025 709/224 |
| 2007/0255809 A1* | 11/2007 | Chiba | H04L 67/025 709/219 |
| 2008/0034123 A1 | 2/2008 | Hirao et al. | |
| 2009/0073969 A1* | 3/2009 | Gobara | H04L 67/02 370/389 |
| 2010/0281118 A1* | 11/2010 | Donahue | H04L 67/14 709/206 |
| 2010/0312899 A1* | 12/2010 | Herzog | H04L 67/141 709/228 |
| 2010/0321899 A1* | 12/2010 | Vossoughi | B60R 11/02 361/728 |
| 2011/0047261 A1* | 2/2011 | Gobara | H04L 29/1233 709/224 |
| 2011/0264811 A1* | 10/2011 | Arima | H04L 29/12783 709/227 |
| 2012/0159267 A1* | 6/2012 | Gyorffy | G06F 11/0709 714/55 |

FOREIGN PATENT DOCUMENTS

| | | |
|---|---|---|
| JP | 2010-283594 A | 12/2010 |
| JP | 2011-004253 A | 1/2011 |
| KR | 100864481 B1 * | 10/2008 |
| WO | WO 2006/030679 A1 | 3/2006 |

* cited by examiner

| Notification means type | Notification means | Corresponding notification means additional information |
|---|---|---|
| NotifyServer | Notify via notification server | |
| GlobalIP | Directly notify specified global IP | IP address/port number |
| RouterUPnPIGD | Directly notify via NAT router (UPnP IGD) | IP address/port number |
| RouterUserSetting | Directly notify via NAT router (user setting) | IP address/port number |
| ProxyServer | Directly notify via proxy server | IP address/port number |
| Mail | Notify by email | mail addr |
| Polling | Notify by polling by device | |

| DeviceID | 03000000-0000-0000-0000-0000c293975d |
|---|---|
| Notification means type | GlobalIP |
| Notification means additional information | IPAddr1/port1 |
| Expiration date/time | 2012/01/29 23:12 |
| Communication environment information | Communication environment information 1 |
| Priority | 100 |

(B)

| DeviceID | 03000000-0000-0000-0000-0000c293975d |
|---|---|
| Notification means type | RouterUPnPIGD |
| Notification means additional information | IPAddr2/port2 |
| Expiration date/time | |
| Communication environment information | Communication environment information 2 |
| Priority | 200 |

(C)

| DeviceID | 03000000-0000-0000-0000-0000c293975d |
|---|---|
| Notification means type | ProxyServer |
| Notification means additional information | IPAddr3/port3 |
| Expiration date/time | |
| Communication environment information | Communication environment information 3 |
| Priority | 200 |

(D)

| DeviceID | 03000000-0000-0000-0000-0000c293975d |
|---|---|
| Notification means type | NotifyServer |
| Notification means additional information | IPAddr4/port4 |
| Expiration date/time | |
| Communication environment information | Communication environment information 4 |
| Priority | 200 |

(E)

| DeviceID | 03000000-0000-0000-0000-0000c293975d |
|---|---|
| Notification means type | Mail |
| Notification means additional information | MailAddr1 |
| Expiration date/time | |
| Communication environment information | Communication environment information 5 |
| Priority | 500 |

FIG.15

| Communication environment type | Notification means type | Priority |
|---|---|---|
| Global IP | Global IP | 100 |
| Router (UPnP IGD) | Router / UPnP IGD | 200 |
| Router/user NAT setting is supported | Router User Setting | 200 |
| Router/UPnP IGD is not supported | Notify Server | 200 |
| Proxy Server | Notify Server | 200 |
| Different from above and notification by polling is supported | Polling | 300 |
| Different from above and notification by email is supported | Mail | 500 |

FIG.17

INFORMATION PROCESSING APPARATUS, INFORMATION PROCESSING SYSTEM, AND INFORMATION PROCESSING METHOD

TECHNICAL FIELD

The present technology relates to an information processing apparatus capable of communicating with another information processing apparatus in a network via a communication relay apparatus, an information processing system including the information processing apparatus, an information processing method executed by the information processing apparatus, and a program executed by the information processing apparatus.

BACKGROUND ART

In communication process between information processing apparatuses via communication relay apparatuses such as NAT routers, proxy servers, and the like, if they do not communicate with each other for a predetermined period of time, a communication relay apparatus may cut off connection. In view of this, the communication relay apparatuses communicate with each other to maintain connection at a constant time interval (Keep Alive, HeartBeat communication). For example, the following Patent Document 1 describes Keep Alive.

Patent Document 1: Japanese Patent Application Laid-open No. 2009-232358

SUMMARY OF INVENTION

Problem to be Solved by the Invention

However, the period of time until the communication relay apparatus cuts off connection varies largely depending on a communication relay apparatus and the communication environment of the communication relay apparatus. In spite of the fact, according to a communication relay apparatus in the past, because Keep Alive communication is established at a constant time interval, communication is established more than the frequency necessary to maintain connection per se, which leads to increase in communication load and traffic.

In view of the above-mentioned circumstances, it is an object of the present technology to provide an information processing apparatus, an information processing system, an information processing method, and a program capable of reducing a communication load resulting from communication process to maintain connection between information processing apparatuses.

Means for Solving the Problem

To solve the above-mentioned problem, an information processing apparatus according to the present technology includes a communication unit and a controller. The communication unit is capable of communicating with another information processing apparatus via a relay server in a network. The controller is capable of obtaining communication environment information indicating a communication environment of the communication unit, the communication environment information including attribute information on a communication relay apparatus relaying communication between the communication unit and the relay server. Further, the controller is capable of calculating a sending interval to send maintenance signals to maintain connection with the relay server based on the obtained communication environment information. Further, the controller is capable of controlling the communication unit to send the maintenance signals to the relay server at the calculated sending interval.

According to this configuration, because the information processing apparatus is capable of determining the sending interval of the maintenance signals depending on the communication environment of the communication relay apparatus, it is possible to reduce the communication load resulting from the sending process of the maintenance signals compared to the case where maintenance signals are sent without exception without depending on a communication environment.

After the communication unit connects to the relay server, if the communication relay apparatus cuts off the connection, the controller may calculate duration time between the connection and the cutoff, and calculate the sending interval of the maintenance signals based on the calculated duration time.

With this configuration, by calculating the sending interval of the maintenance signals based on the time period of past communication with the relay server until connection is cut off, the information processing apparatus is capable of maintaining connection by sending the maintenance signals at an appropriate interval when the information processing apparatus communicates with the relay server the next time.

The communication unit may be capable of communicating with a connection test server in the network. In this case, after the communication unit connects to the connection test server, if the communication relay apparatus cuts off the connection, the controller may calculate duration time between the connection and the cutoff, and calculate the sending interval of the maintenance signals based on the calculated duration time.

With this configuration, the information processing apparatus communicates with the connection test server before communicating with the relay server, and calculates a sending interval of maintenance signals based on the time period until connection therewith is cut off, whereby it is possible to communicate with the relay server without cutting off connection from the beginning.

The communication unit may be capable of receiving, from the relay server, notification message notifying of existence of data sent from the other information processing apparatus to the information processing apparatus. In this case, the controller may be capable of creating setting information to be set in order that the relay server connect to the information processing apparatus and send the notification message depending on the communication environment, and capable of controlling the communication unit to send the created setting information to the relay server. In this case, the relay server may store the sent setting information, and sends the notification message based on the stored setting information.

With this configuration, the information processing apparatus is capable of sending setting information to the relay server depending on the communication environment, and receiving a notification message reliably.

The controller may be capable of updating the created setting information depending on a change of the communication environment, and capable of controlling the communication unit to send the updated setting information to the relay server. In this case, the relay server may update the stored setting information with the updated and sent setting information.

With this configuration, even if the communication environment may change in a case where the information processing apparatus is a mobile terminal, for example, the information processing apparatus is capable of updating setting information in response to the change, and the relay server is capable of setting the updated setting information.

The controller may be capable of previously creating the plurality of pieces of setting information to be created depending on a change of the communication environment. Further, the controller may be capable of controlling the communication unit to send the plurality of pieces of created setting information to the relay server. Further, the controller may be capable of creating, if the communication environment is changed and if none of the plurality of pieces of sent setting information corresponds to the communication environment after the change, new setting information corresponding to the communication environment after the change. Further, the controller may be capable of controlling the communication unit to send the created new setting information to the relay server. In this case, the relay server may store the plurality of pieces of sent setting information, and sends the notification message based on at least one of the plurality of pieces of stored setting information.

With this configuration, because the information processing apparatus previously sends a plurality of pieces of setting information corresponding to a plurality of communication environment to the server, it is not necessary to send setting information to the relay server every time the communication environment changes, whereby it is possible to reduce the load of the sending process for the information processing apparatus and the server.

The information processing apparatus may further include a storage unit. In this case, the communication unit may be capable of periodically receiving, from the relay server, reconnection information on timing when the information processing apparatus reconnects to the relay server if connection between the information processing apparatus and the relay server is cut off, the reconnection information being created depending on the number of a plurality of information processing apparatuses connected to the relay server including the information processing apparatus. In this case, the controller may be capable of controlling the storage unit to store the newest reconnection information out of the periodically-received reconnection information. Further, the controller may be capable of controlling the communication unit to reconnect to the relay server based on the stored reconnection information if connection between the information processing apparatus and the relay server is cut off.

With this configuration, if connection with the relay server is cut off resulting from any malfunction, the information processing apparatus reconnects to the relay server based on the stored reconnection information, which is the newest at the time. Because of this, a large number of other information processing apparatuses, which connected to the relay server, do not request the relay server to reconnect at the same time, whereby it is possible to prevent connection errors from occurring, and a load for the relay server is reduced.

The communication unit may receive, as the reconnection information, information on maximum waiting time between the cutoff and the reconnection. In this case, the controller may determine waiting time within the maximum waiting time based on a random number. Further, the controller may control the communication unit to reconnect to the relay server after the determined waiting time passes.

With this configuration, if the information processing apparatus receives the maximum waiting time information from the relay server and only randomly determines waiting time within the maximum waiting time, it is possible to prevent further communication errors at the server from occurring.

The relay server may reply ACK including information concerning the maximum waiting time in response to the sent maintenance signal. In this case, the communication unit may receive the ACK, and the controller may obtain the information concerning the maximum waiting time from the received ACK.

With this configuration, it is possible to prevent the communication load from being increased resulting from the sending process of information concerning the maximum waiting time from the relay server.

An information processing system according to another embodiment of the present technology includes a first information processing apparatus and a second information processing apparatus. The first information processing apparatus includes a first communication unit and a first controller. The first communication unit is capable of communicating with another information processing apparatus via the second information processing apparatus. The first controller is capable of obtaining communication environment information concerning a communication environment of the first communication unit, the communication environment information including attribute information on a communication relay apparatus relaying communication between the first information processing apparatus and the second information processing apparatus. Further, the first controller is capable of calculating a sending interval to send maintenance signals to maintain connection with the second information processing apparatus based on the obtained communication environment information. Further, the first controller is capable of controlling the communication unit to send the maintenance signals to the second information processing apparatus at the calculated sending interval. The second information processing apparatus includes a second communication unit and a second controller. The second communication unit is capable of relaying communication between the first information processing apparatus and the other information processing apparatus by communicating with the first communication unit. The second controller is capable of controlling the second communication unit to receive a maintenance signal sent from the first information processing apparatus, and to send ACK to the first information processing apparatus in response to the maintenance signal.

An information processing method according to another embodiment of the present technology includes obtaining communication environment information concerning a communication environment of an information processing apparatus, the communication environment information including attribute information on a communication relay apparatus relaying communication between the information processing apparatus and a relay server. The communication relay apparatus connects to an information processing apparatus capable of communicating with another information processing apparatus via the relay server in a network. The method further includes calculating a sending interval to send maintenance signals to maintain connection with the relay server based on the obtained communication environment information. Then, the maintenance signals are sent to the relay server at the calculated sending interval.

A program according to another embodiment of the present technology causes an information processing apparatus capable of communicating with another information processing apparatus via a relay server in a network, to execute the step of obtaining, the step of calculating, and the step of sending. In the step of obtaining, communication environment information concerning a communication environment of the information processing apparatus is obtained, the communication environment information including attribute information on a communication relay apparatus relaying communication between the information processing apparatus and a relay server. In the step of calculating, a sending interval to send maintenance signals to maintain connection with the relay server is calculated based on the obtained communication environment information. In the step of sending, the maintenance signals are sent to the relay server at the calculated sending interval.

Effect of the Invention

As described above, according to the present technology, it is possible to reduce a communication load resulting from the communication process to maintain connection between the information processing apparatuses.

BRIEF DESCRIPTION OF DRAWINGS

FIG. 14 A diagram showing examples of types of notification means and notification means additional information corresponding to the types according to the second embodiment.

FIG. 15 Diagrams showing examples of notification means setting information of the second embodiment.

FIG. 17 A diagram showing a method of creating the notification means setting information according to the second embodiment.

MODES FOR CARRYING OUT THE INVENTION

Hereinafter, embodiments of the present technology will be described with reference to the drawings.

First Embodiment

Firstly, the first embodiment of the present technology will be described.

[Network Configuration of System]

Figure 1:
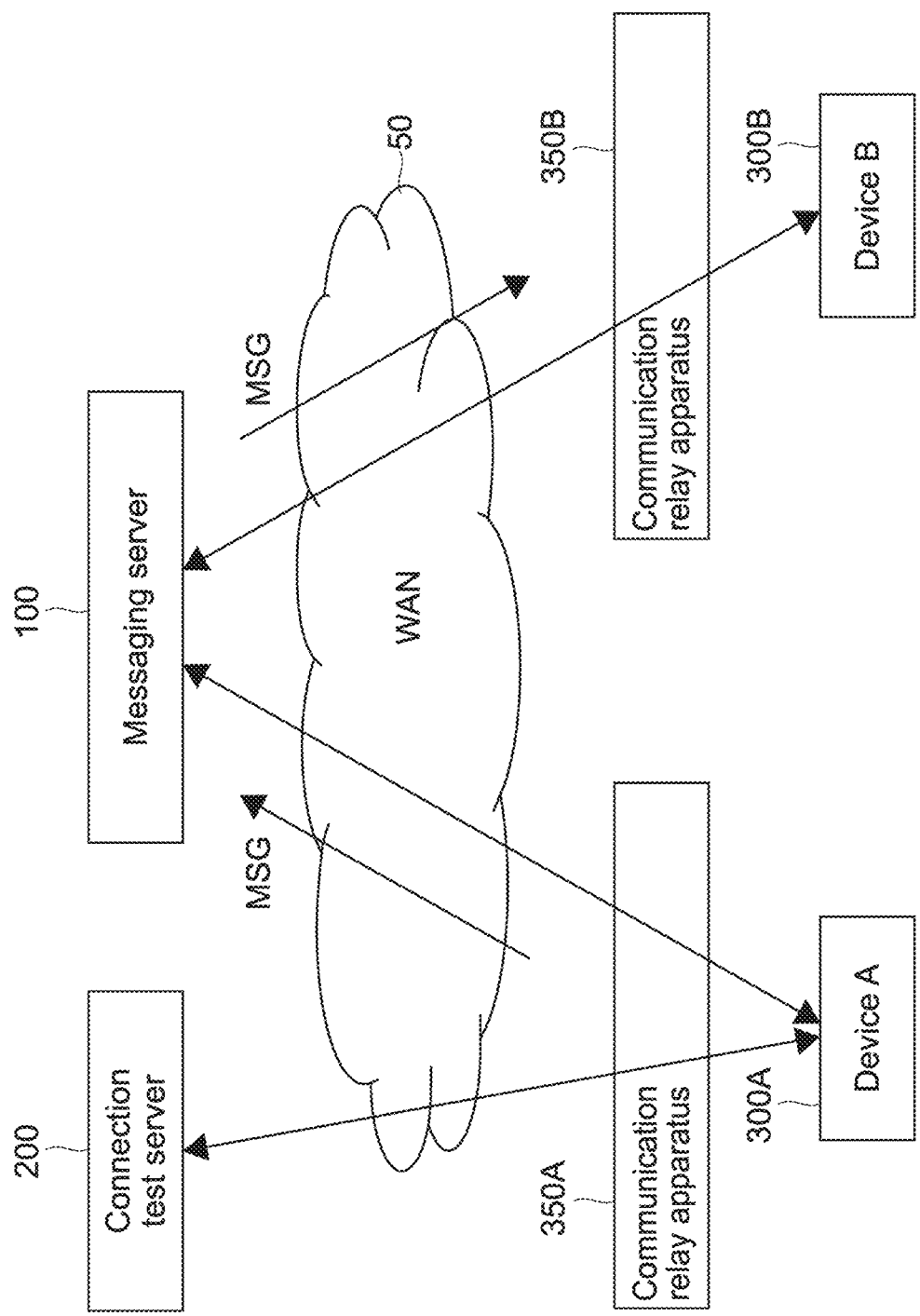
FIG. 1 A diagram showing a network configuration of a system of a first embodiment of the present technology.

FIG. 1 is a diagram showing a network configuration of a system of this embodiment.

As shown in FIG. 1, the system includes a messaging server 100 and a connection test server 200 in a cloud, and a plurality of devices 300 capable of connecting to those servers via a WAN (Wide Area Network) 50.

The device 300 may be any information processing apparatus such as for example a smartphone, a mobile phone, a tablet PC (Personal Computer), a desktop PC, a laptop PC, a PDA (Personal Digital Assistant), a mobile AV player, an E-book reader, a digital still camera, a camcorder, a television set, a PVR (Personal Video Recorder), a video game console, an automotive navigation system, or a digital photo frame. FIG. 1 illustrates only two devices, i.e., the device 300A and the device 300B, but three or more devices 300 may be provided.

Each device 300 communicates with the above-mentioned messaging server 100 and connection test server 200 via a communication relay apparatus 350, or directly communicates with those servers via no communication relay apparatus 350. Each device 300 is capable of always connecting to and communicating with the messaging server 100.

The communication relay apparatus 350 is configured to perform communication-relay functions between an internal (device 300 side) network and an external (cloud side) network, and to determine a particular internal device and to disable connection of this internal device unless an external server does not take a special measure against difference of addresses used in the both networks and against a security mechanism. Such a communication relay apparatus 350 is for example a NAT router, a proxy server, or a firewall.

The connection test server 200 is capable of communicating with the respective devices 300. The connection test server 200 is a server provided to test, before communication between each device 300 and the messaging server 100, connection to previously prevent the communication being cut off. Note that the device 300 may or may not use the connection test server 200.

FIG. 1 illustrates only one messaging server 100 in the cloud, but a plurality of messaging servers 100 may be provided. In this case, the plurality of messaging servers 100 may relay messages from the devices 300.

That is, a particular messaging server 100 out of the plurality of messaging servers 100 is allocated to each device 300 as a server to be used (server in charge). Any allocation method may be employed, and for example the messaging servers may be allocated based on IDs of the respective devices and the respective messaging servers. As described below, if a messaging server 100 receives a message sent from a device 300, this messaging server 100 being not in charge of this device, the message is transferred to another messaging server 100, which is in charge of this device.

[Hardware Configuration of Messaging Server]

Figure 2:
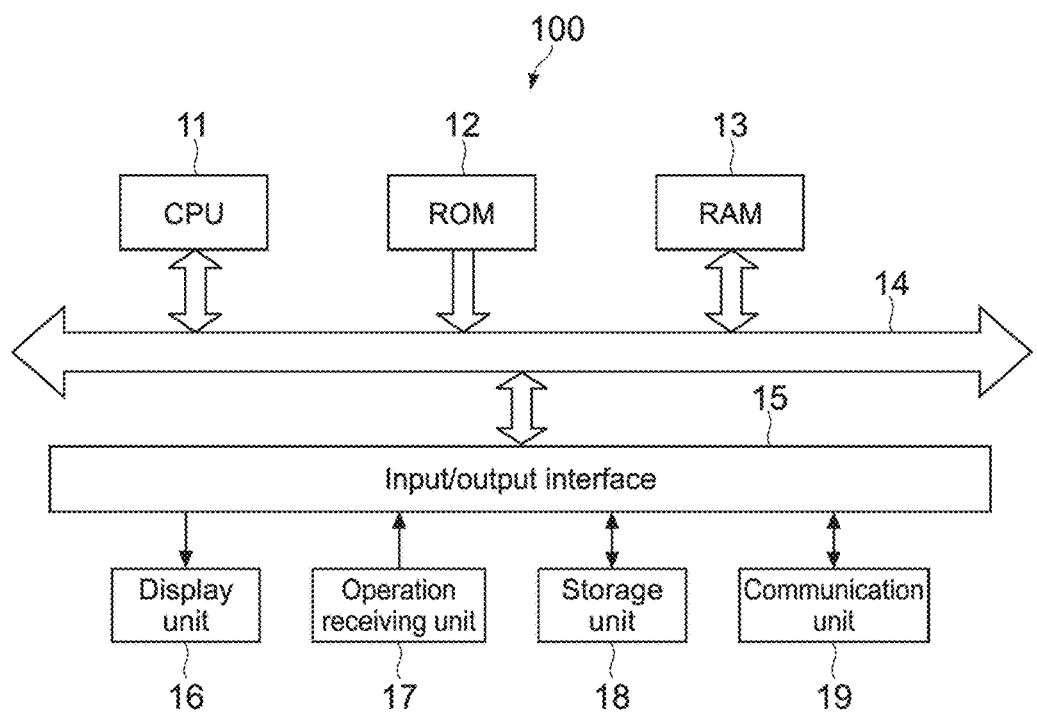
FIG. 2 A block diagram showing the hardware configuration of a messaging server of the above-mentioned system.

FIG. 2 is a diagram showing the hardware configuration of the above-mentioned messaging server 100. As shown in FIG. 2, the messaging server 100 includes a CPU (Central Processing Unit) 11, a ROM (Read Only Memory) 12, a RAM (Random Access Memory) 13, an input/output interface 15, and a bus 14 connecting them.

The CPU 11 as necessary accesses the RAM 13 and the like appropriately, performs various kinds of arithmetic processing, and entirely controls the respective blocks of the messaging server 100. The ROM 12 is a nonvolatile fixed memory storing firmware such as an OS and programs executed by the CPU 11 and various parameters. The RAM 13 is used as a work area and the like for the CPU 11, and temporarily stores the OS, various kinds of application software being executed, and various kinds of data being processed.

The display unit 16, the operation receiving unit 17, the storage unit 18, the communication unit 19, and the like connect to the input/output interface 15.

The display unit 16 is a display device employing for example an LCD (Liquid Crystal Display), an OELD (Organic ElectroLuminescence Display), a CRT (Cathode Ray Tube), or the like.

The operation receiving unit 17 is for example a pointing device such as a mouse, a keyboard, a touchpad, or another input apparatus. If the operation receiving unit 17 is a touchpad, the touchpad and the display unit 16 may be structured integrally.

the storage unit 18 is a nonvolatile memory such as for example a HDD (Hard Disk Drive), a flash memory (SSD: Solid State Drive), or another solid-state memory. The storage unit 18 stores the above-mentioned OS, various kinds of application software, and various kinds of data. Specifically, in this embodiment, the storage unit 18 stores programs such as a plurality of software modules described later.

The communication unit 19 is an NIC or the like for connecting the WAN 50, and is in charge of communication with the devices 300.

[Hardware Configuration of Connection Test Server]

The hardware configuration of the above-mentioned connection test server 200 is similar to the above-mentioned hardware configuration of the messaging server, and description thereof will thus be omitted. In this embodiment, the hardware modules of the connection test server 200 corresponding to the CPU 11, the storage unit 18, and the communication unit 19 of the above-mentioned messaging server 100 will be referred to as a CPU 21, a storage unit 28, and a communication unit 29, respectively.

[Hardware Configuration of Device]

Figure 3:
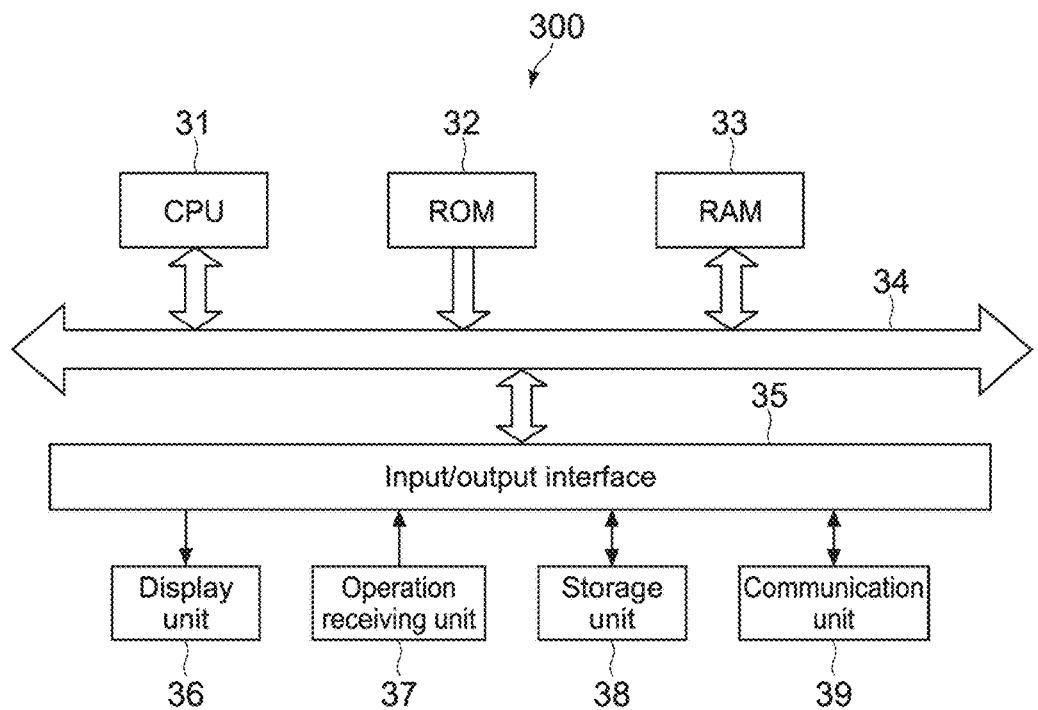
FIG. 3 A block diagram showing the hardware configuration of a device of the above-mentioned system.

FIG. 3 is a diagram showing the hardware configuration of the above-mentioned device 300. As shown in FIG. 3, the hardware configuration of the device 300 is basically similar to the hardware configuration of the above-mentioned server 100. That is, the device 300 includes a CPU 31, a ROM 32, a RAM 32, an input/output interface 35, a bus 34 connecting them, a display unit 36, an operation receiving unit 37, a storage unit 38, and a communication unit 39. Here, the display unit 36 may be built in the device 300, or externally connected to the device 300.

The CPU 31 controls the respective blocks such as the storage unit 38 and the communication unit 39, establishes communication with the messaging server 100 and the connection test server 200, and performs various kinds of data processing.

The storage unit 38 stores programs such as a plurality of software modules described later and various databases. The programs may be provided to the device 300 via the WAN 50, or the programs in a storage medium, which is capable of being read by the device 300, may be provided.

[Configuration of Modules of Each Apparatus]

(Configuration of Modules of Messaging Server)

Figure 4:
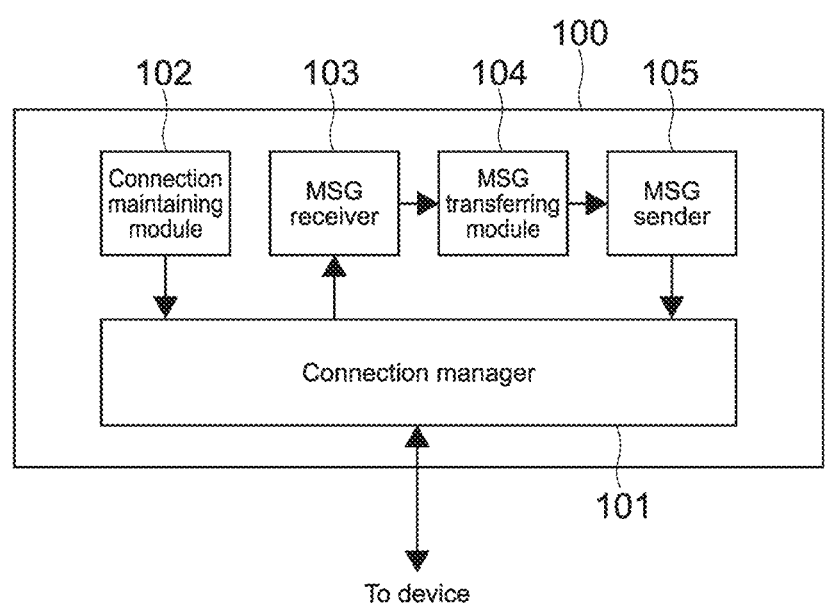
FIG. 4 A block diagram showing the configuration of the software modules of the messaging server of the above-mentioned system.

FIG. 4 is a diagram showing the configuration of the software modules of the above-mentioned messaging server 100.

As shown in FIG. 4, the messaging server 100 includes software modules, i.e., a connection manager 101, a connection maintaining module 102, a message receiver 103, a message transferring module 104, and a message sender 105.

The connection manager 101 establishes connection with the respective devices 300, and manages all the established connections.

The connection maintaining module 102 establishes communication (Keep Alive communication) to maintain connection with the devices 300 via connection of the above-mentioned connection manager 101. That is, the connection maintaining module 102 replies ACK in response to a Keep Alive packet (connect maintenance signal) sent from the device 300.

The message receiver 103 receives a message (data) from the device 300 via connection of the connection manager 101.

The message transferring module 104 transfers a message to another messaging server (not shown) in order to send the message to the device 300, the messaging server 100 being not in charge of device 300 by itself.

The message sender 105 sends a message (data) from one device 300 to another device 300 via connection of the connection manager 101.

(Configuration of Modules of Device)

Figure 5:
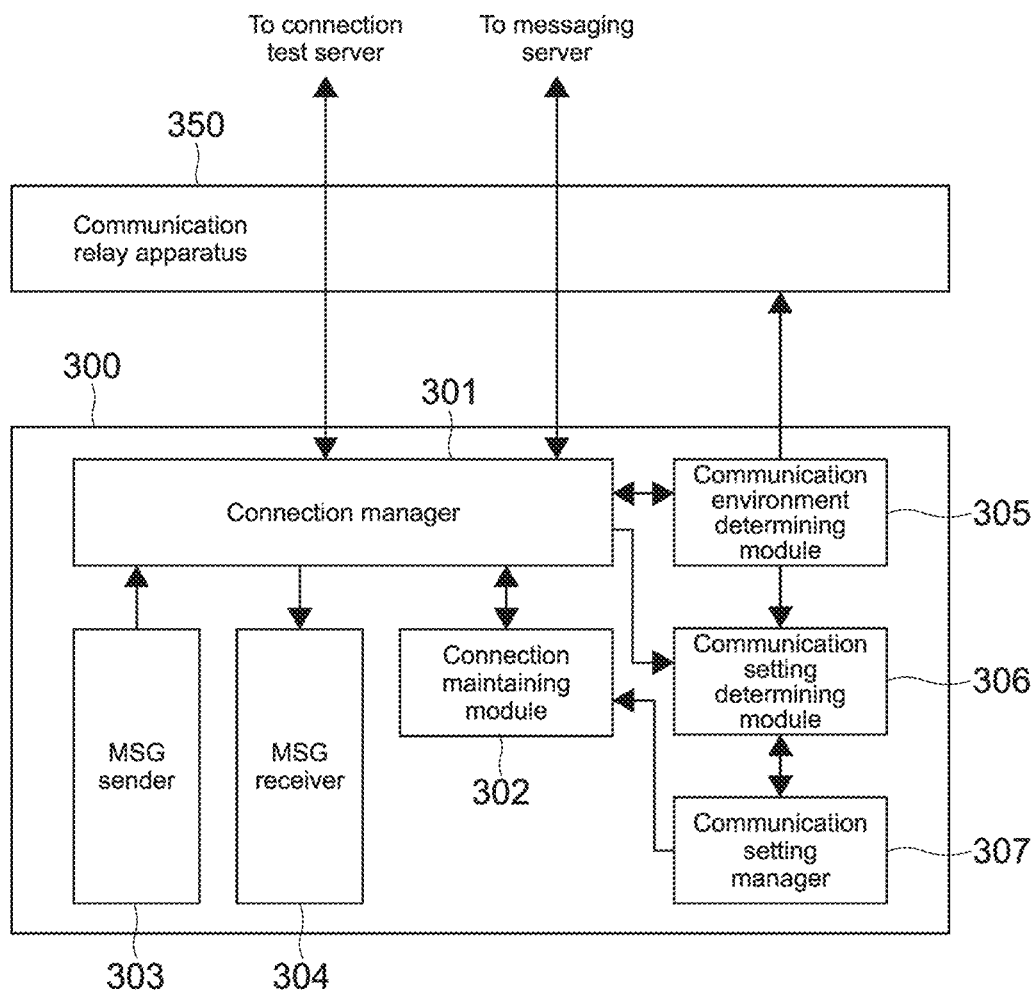
FIG. 5 A block diagram showing the configuration of the software modules of the device of the above-mentioned system.

FIG. 5 is a diagram showing the configuration of the software modules of the above-mentioned device 300.

As shown in FIG. 5, the device 300 includes a connection manager 301, a connection maintaining module 302, a message sender 303, a message receiver 304, a communication environment determining module 305, a communication setting determining module 306, and a communication setting manager 307.

The connection manager 301 establishes connection with the messaging server 100 and the connection test server 200, and manages all the established connections.

The connection maintaining module 302 establishes communication (Keep Alive communication) in order to maintain connection with the messaging server 100 via connection of the above-mentioned connection manager 301. That is, the connection maintaining module 302 sends Keep Alive packets (connect maintenance signals) to the messaging server 100 at a sending interval determined in processing described below.

The message sender 303 sends messages (data) to the messaging server 100 and the connection test server 200 via connection of the connection manager 301.

The message receiver 304 receives messages (data) from the messaging server 100 and the connection test server 200 via connection of the connection manager 301.

The communication environment determining module 305 determines the current communication environment of the device 300. The communication environment determining processing will be described in detail later.

The communication setting determining module 306 determines communication setting for each communication environment based on communication environment information determined by the communication environment determining module 305. The communication setting determining processing will also be described in detail later.

The communication setting manager 307 manages communication setting information for each communication environment determined by the above-mentioned communication setting determining module 306.

[Operations of System]

Next, the operations of the messaging server 100 and the device 300 of the system configured as described above will be described. In this embodiment and the other embodiments, a CPU and the above-mentioned respective software modules, which are controlled and executed by the CPU, cooperatively execute operations of the messaging server 100 or the device 300.

[Operation of Device]

First, operation of the device 300 will be described.

(Communication Environment Determining Processing)

Figure 6:
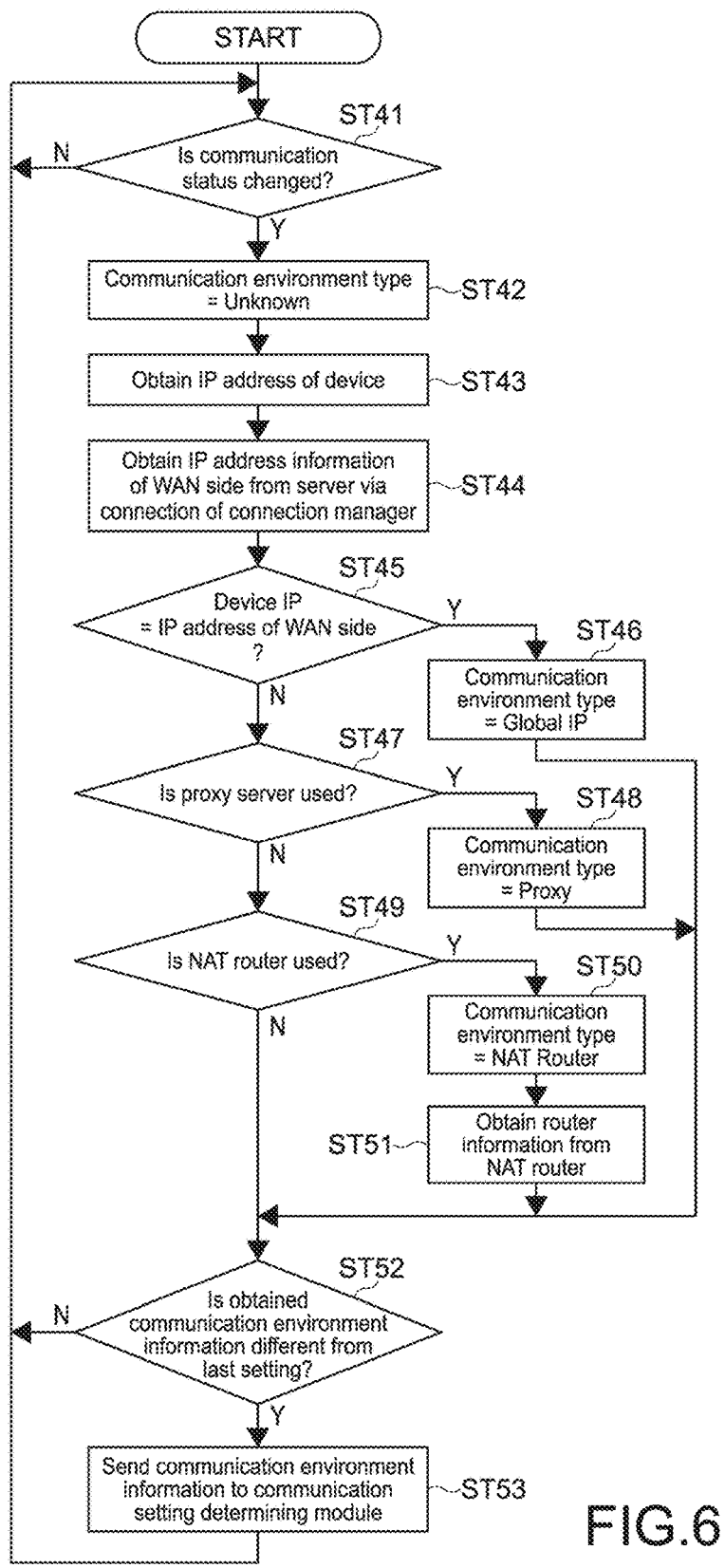
FIG. 6 A flowchart showing the flow of communication environment determining processing performed by the above-mentioned device.

First, communication environment determining processing will be described. FIG. 6 is a flowchart showing the flow of communication environment determining processing performed by the device 300. Before performing the processing of FIG. 6, connection between the device 300 and the messaging server 100 is established.

As shown in FIG. 6, the communication environment determining module 305 determines if the communication status is changed or not (Step 41).

If it is determined that the communication status is changed (Yes), the communication environment determining module 305 determines that the communication environment type is "Unknown" (Step 42).

Then the communication environment determining module 305 obtains the IP address of the device 300 (Step 43).

Then the communication environment determining module 305 obtains IP address information (IP address that the messaging server 100 uses to connect the device 300) of the WAN side from the messaging server 100 via connection of the connection manager 301 (Step 44).

Then the communication environment determining module 305 determines if the obtained IP address of the device 300 is the same as the IP address of the WAN side obtained from the above-mentioned messaging server 100 or not (Step 45).

If it is determined that the IP address of the device 300 is the same as the IP address of the WAN side (Yes), the communication environment determining module 305 determines that the communication environment type is "Global IP" (Step 46).

If it is determined that the IP address of the device 300 is different from the IP address of the WAN side (No), the communication environment determining module 305 determines if the device 300 uses a proxy server or not (Step 47).

If it is determined that the device 300 uses a proxy server (Yes), the communication environment determining module 305 determines that the communication environment type is "Proxy" (Step 48).

If it is determined that the device 300 does not use a proxy server (No), the communication environment determining module 305 determines if the device 300 uses a NAT router or not (Step 49).

If it is determined that the device 300 uses a NAT router (Yes), the communication environment determining module 305 determines that the communication environment type is "NAT Router" (Step 50), and obtains router information from a NAT router (communication relay apparatus 305) (Step 51).

Then the communication environment determining module 305 obtains communication environment information based on the above-mentioned determined communication environment type, and determines if the communication environment information is different from the last setting or not (Step 52).

Further, if it is determined that the communication environment information is different from the last setting (Yes), the communication environment determining module 305 sends the communication environment information to the communication setting determining module 306 (Step 53).

Here, the communication environment information is obtained based on the above-mentioned communication environment type, uniquely determines a communication environment, and specifically includes the following information.

Communication status
IP address/port number of WAN side
IP address/port number of device
Communication environment type
Router information (model name of router/MAC address/correspondence information on UPnP IGD, etc.)

(Communication Setting Determining Processing)

Next, communication setting determining processing based on the above-mentioned communication environment information will be described. One of two kinds of communication setting determining processing may be employed depending on whether the device 300 uses the above-mentioned connection test server 200 or not before communication with the messaging server 100.

(Communication Setting Determining Processing (1))

Figure 7:
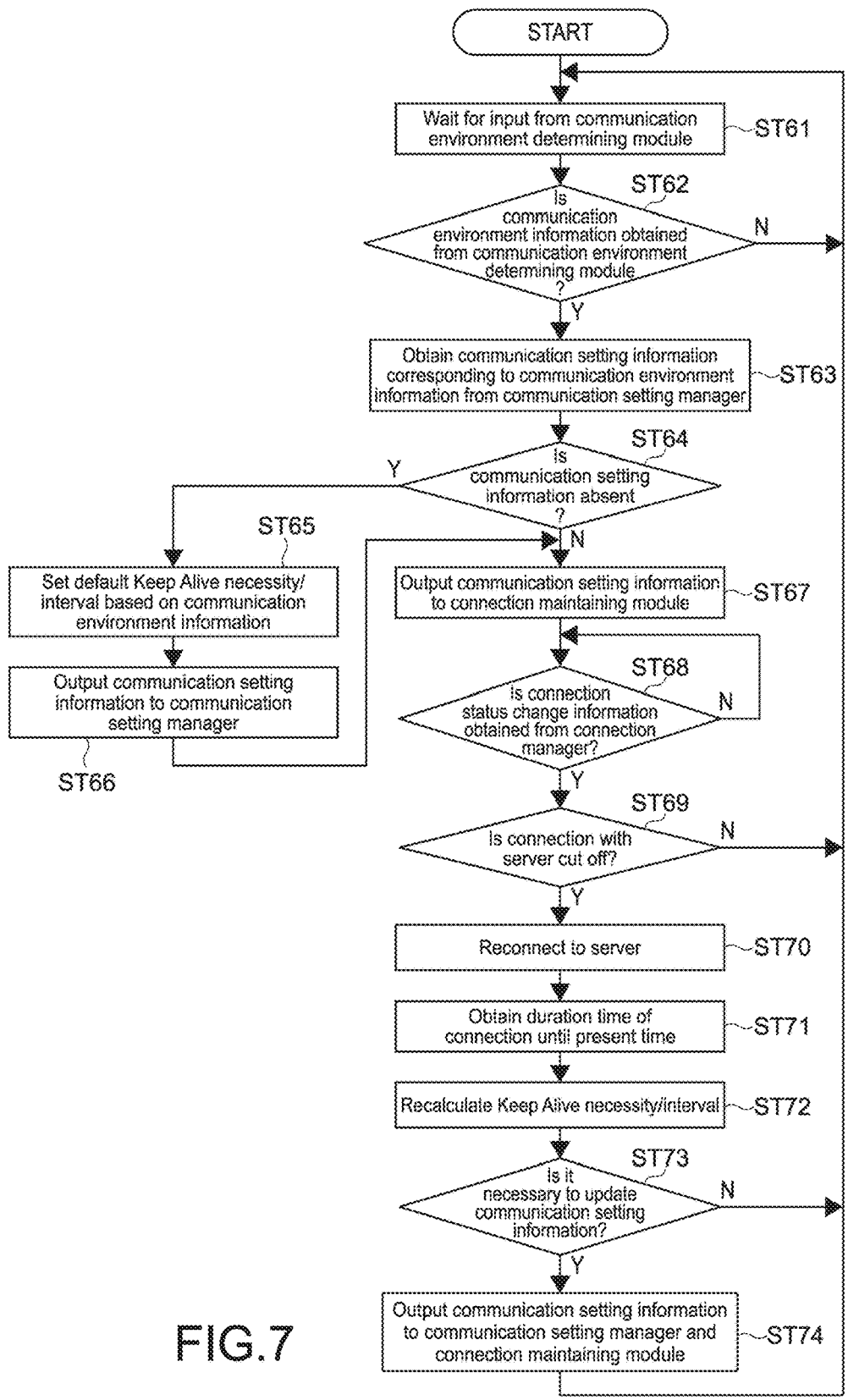
FIG. 7 A flowchart showing an example of the flow of communication environment setting process performed by the above-mentioned device.

FIG. 7 is a flowchart showing the flow of communication setting determining processing in the case where the device 300 does not use the connection test server 200.

As shown in FIG. 7, the communication setting determining module 306 of the device 300 waits for communication environment information input from the communication environment determining module 305 (Step 61).

If the above-mentioned communication environment information is obtained from the communication environment determining module 305 (Step 62, Yes), the communication setting determining module 306 obtains communication setting information corresponding to the communication environment information from the above-mentioned communication setting manager 307 (Step 63).

Here, the communication setting information includes the above-mentioned communication environment information, and in addition information determining necessity of Keep Alive communication and the sending interval of the Keep Alive packet (hereinafter also referred to as Keep Alive necessity/interval).

If it is determined that corresponding communication setting information is absent (Step 64, Yes), the communication environment determining module 305 sets the default Keep Alive necessity/interval based on the above-mentioned communication environment information, and creates communication setting information (Step 65). Further, the communication environment determining module 305 outputs the communication setting information to the communication setting manager 307 (Step 66).

If there is the above-mentioned corresponding communication environment information (Step 64, No) and if the communication environment information created based on the above-mentioned default setting is output to the communication setting manager 307, the communication setting determining module 306 outputs the communication setting information to the connection maintaining module 302 (Step 67).

Then the communication setting determining module 306 determines if connection status change information is obtained from the connection manager 301 or not (Step 68).

If the above-mentioned connection status change information is obtained (Yes), the communication setting determining module 306 determines if connection with the messaging server 100 is cut off or not based on the connection status change information (Step 69).

If it is determined that connection with the messaging server 100 is cut off, the communication setting determining module 306 reconnects to the messaging server 100 via the connection manager 301 (Step 70).

Then the communication setting determining module 306 obtains the duration time of connection with the messaging server 100 until the present time (connection cut-off time) from the connection manager 301 (Step 71).

Then the communication setting determining module 306 recalculates the Keep Alive necessity/interval based on the above-mentioned obtained connection duration time (Step 72). That is, the communication setting determining module 306 calculates for example the time same as the connection duration time as the Keep Alive interval. However, the sending interval of the Keep Alive packets may be slightly shorter than the above-mentioned connection duration time (predetermined time is subtracted).

Then the communication setting determining module 306 determines if it is necessary to update the above-mentioned communication setting information or not, that is, if the previously-calculated communication setting information is changed or not, based on the above-mentioned recalculated Keep Alive necessity/interval (Step 73).

If it is determined that it is necessary to update the communication setting information (Yes), the communication setting determining module 306 outputs communication setting information, on which the above-mentioned recalculated information is reflected, to the communication setting manager 307 and the connection maintaining module 302 (Step 74).

(Communication Setting Determining Processing (2))

Figure 8:
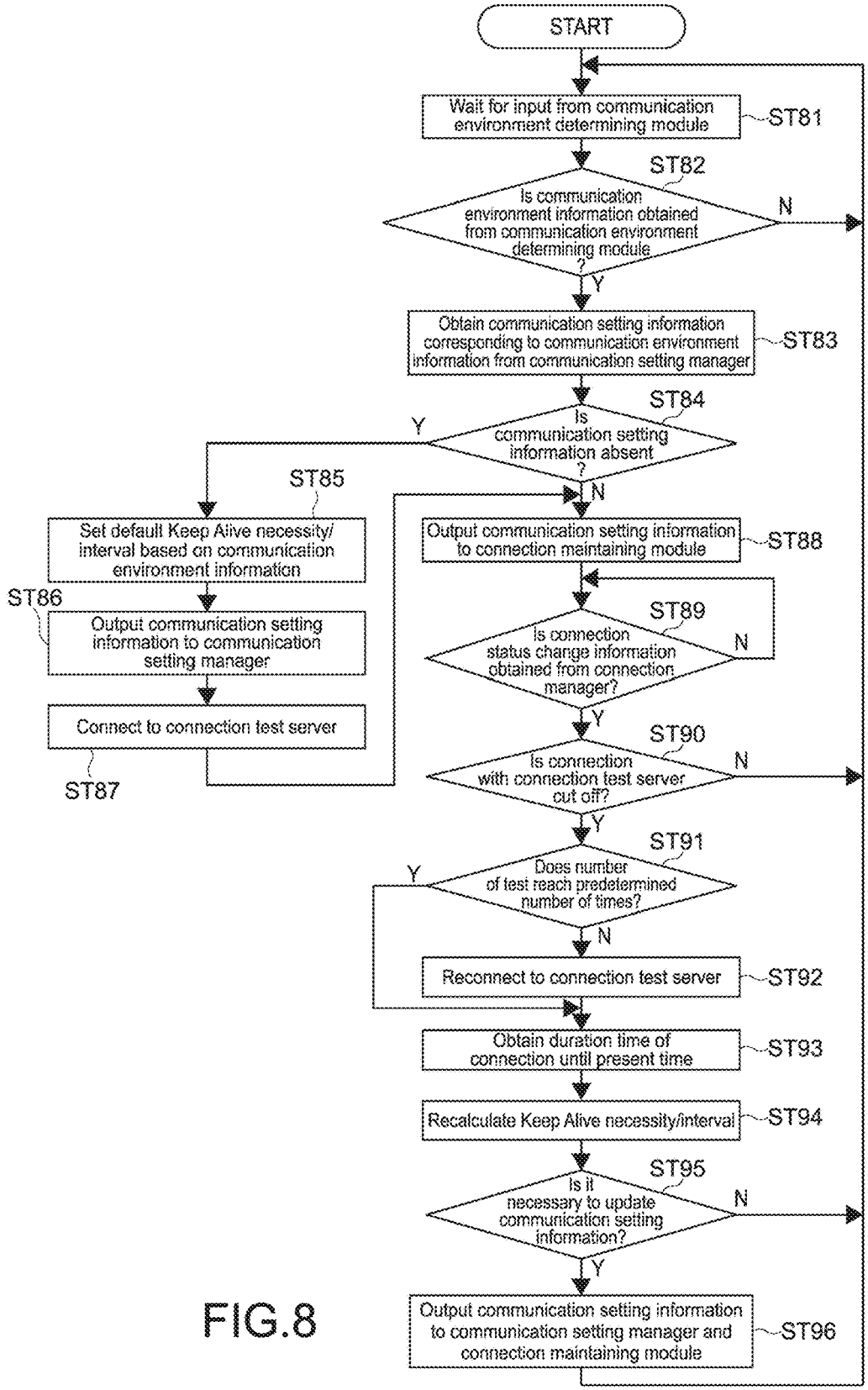
FIG. 8 A flowchart showing another example of the flow of the communication environment setting process performed by the above-mentioned device.

FIG. 8 is a flowchart showing the flow of communication setting determining processing in the case where the device 300 uses the connection test server 200. In the processing of FIG. 8, the device 300 connects to the connection test server 200, which is different from the above-mentioned case of FIG. 7.

As shown in FIG. 8, the processing of Steps 81 to 86 is similar to the above-mentioned processing of Steps 61 to 66 of FIG. 7.

After the communication setting information is output in the above-mentioned Step 86, the communication setting determining module 306 connects to the above-mentioned connection test server 200 via the connection manager 301 (Step 87).

Similar to the above-mentioned case of FIG. 7, then the communication setting determining module 306 outputs the communication setting information to the connection maintaining module 302 (Step 88), and determines if the connection status change information is obtained from the connection manager 301 or not (Step 89).

If it is determined that the connection status change information is obtained (Yes), the communication setting determining module 306 determines if connection with the connection test server 200 is cut off or not based on the connection status change information (Step 90).

Then the communication setting determining module 306 determines if the number of the connection test with the connection test server 200 reaches predetermined number of times or not (Step 91), and if not (No), the connection manager 301 reconnects to the connection test server 200.

If it is determined in the above-mentioned Step 91 that the number of the test reaches the predetermined number of times (Yes), or if the connection test server 200 is reconnected in the above-mentioned Step 92, then processing similar to the above-mentioned Steps 71 to 74 of FIG. 7 is executed (Steps 92 to 96).

That is, the communication setting determining module 306 recalculates the Keep Alive necessity/interval based on the connection duration time with the connection test server 200 until the present time (connection cut-off time), and, if it is determined that it is necessary to update the communication setting information, outputs the communication setting information to the communication setting manager 307 and the connection maintaining module 302.

(Connection Maintaining Processing)

Figure 9:
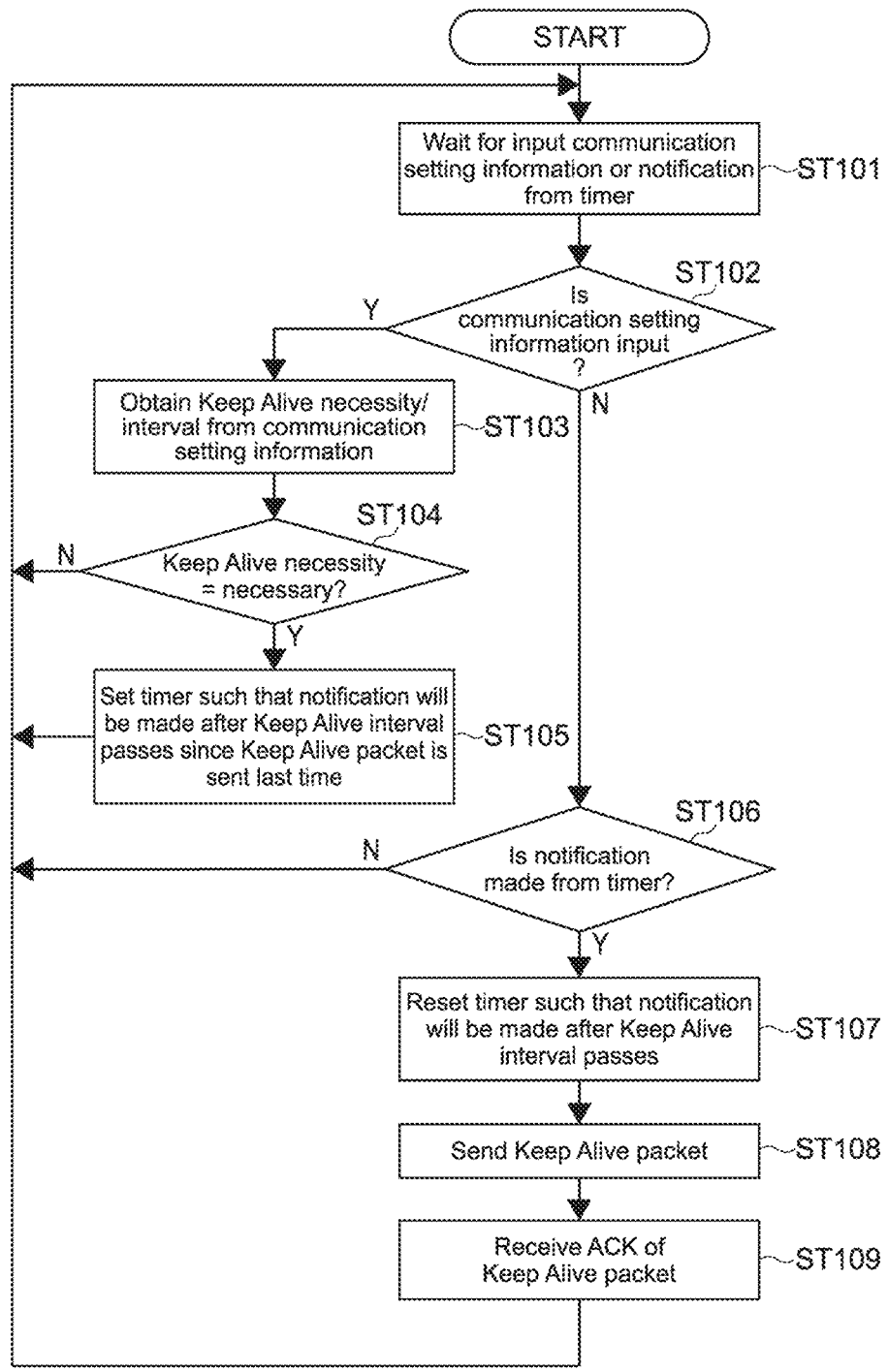
FIG. 9 A flowchart showing the flow of connection maintaining processing performed by the above-mentioned device.

Next, connection maintaining processing based on the above-mentioned communication setting information will be described. FIG. 9 is a flowchart showing the flow of connection maintaining processing performed by the device 300.

First, the connection maintaining module 302 of the device 300 waits for communication setting information input from the above-mentioned communication setting determining module 306 or notification from a timer (Step 101).

If communication setting information is input (Step 102, Yes), the connection maintaining module 302 obtains Keep Alive necessity and sending interval information from the communication setting information (Step 103).

Then the connection maintaining module 302 determines if "necessary" is set for the Keep Alive necessity or not (Step 104).

If it is determined that "necessary" is set for the Keep Alive necessity, the timer is set such that notification will be made after the Keep Alive interval passes since a Keep Alive packet is sent to the messaging server 100 the last time (Step 105).

If the above-mentioned notification is made from the timer (Step 106, Yes), the connection maintaining module 302 resets the timer such that notification will be made after the above-mentioned Keep Alive interval passes (Step 107).

Then the connection maintaining module 302 sends a Keep Alive packet to the messaging server 100 (Step 108), and receives ACK of the Keep Alive packet from the messaging server 100 (Step 109).

[Operations of Messaging Server]

Figure 10:
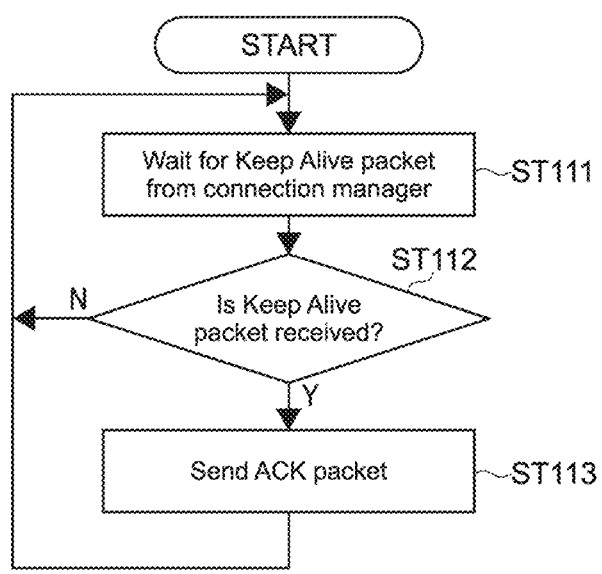
FIG. 10 A flowchart showing the flow of the processing performed by the above-mentioned messaging server.

Next, the operations of the messaging server 100 will be described. FIG. 10 is a flowchart showing the flow of the operations of the messaging server 100.

As shown in FIG. 10, the connection maintaining module 102 of the messaging server 100 waits for a Keep Alive packet from the connection manager 101 to be received (Step 111).

Then, if a Keep Alive packet is received (Step 112, Yes), the connection maintaining module 102 sends an ACK packet to the device 300 in response to the Keep Alive packet (Step 113).

[Conclusion]

As described above, according to this embodiment, the device 300 determines the Keep Alive interval based on the connection duration time in the case where connection with the messaging server 100 or the connection test server 200 is actually cut off, and sends Keep Alive packets. Because of this, the communication load of Keep Alive communication established by the messaging server 100 and the device 300 is reduced compared to a case where Keep Alive packets are sent at a constant interval irrespective of communication environments.

The Second Embodiment

Next, the second embodiment of the present technology will be described. In this embodiment, unless otherwise stated, the configuration is similar to the configuration of the above-mentioned first embodiment. Further, in this embodiment, the functions and configurations similar to the functions and configurations of the above-mentioned first embodiment will be denoted by the similar reference symbols, and description thereof will be omitted or simplified.

Figure 11:
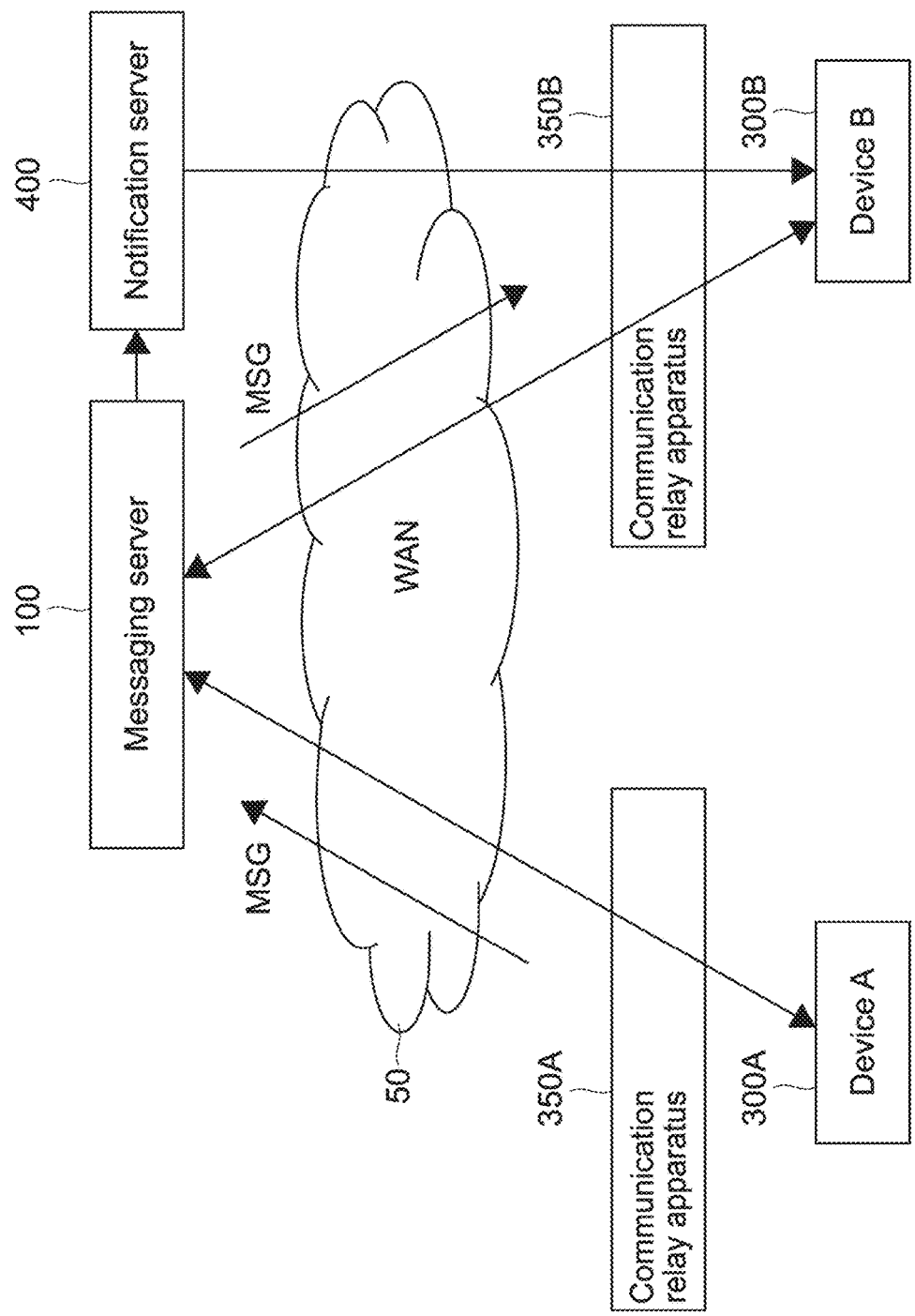
FIG. 11 A diagram showing the network configuration of a system of a second embodiment of the present technology.

FIG. 11 is a diagram showing the network configuration of a system of this embodiment.

In this embodiment, the messaging server 100 has a function of notifying the device 300, i.e., the message destination, of a notification message, which notifies that there is data (message) sent from one device 300 to another device 300. There may be a plurality of means for the notification depending on the communication environment of the device 300 (for example, specs of the communication relay apparatus 350, etc.).

Before communicating with the messaging server 100, each device 300 previously sends notification means setting information, which is used to set a notification means for sending a notification message by the messaging server 100, to the messaging server 100 depending on the communication environment, and causes the messaging server 100 to set a notification means.

Further, the messaging server 100 may send the above-mentioned notification message, or a notification server 400 independently provided in the cloud may send it.

The notification server 400 is provided in order to send the above-mentioned notification message to the device 300 in a case where it is not possible to establish direct communication with an external apparatus (messaging server 100) because of existence of the above-mentioned communication relay apparatuses 350. The notification server 400 is capable of communicating with the messaging server 100 and the respective devices 300 via the WAN 50. If the device 300 uses the notification server 400, the device 300 always connects to the notification server 400, and connects to the messaging server 100 as necessary.

[Software Configuration of Messaging Server]

Figure 12:
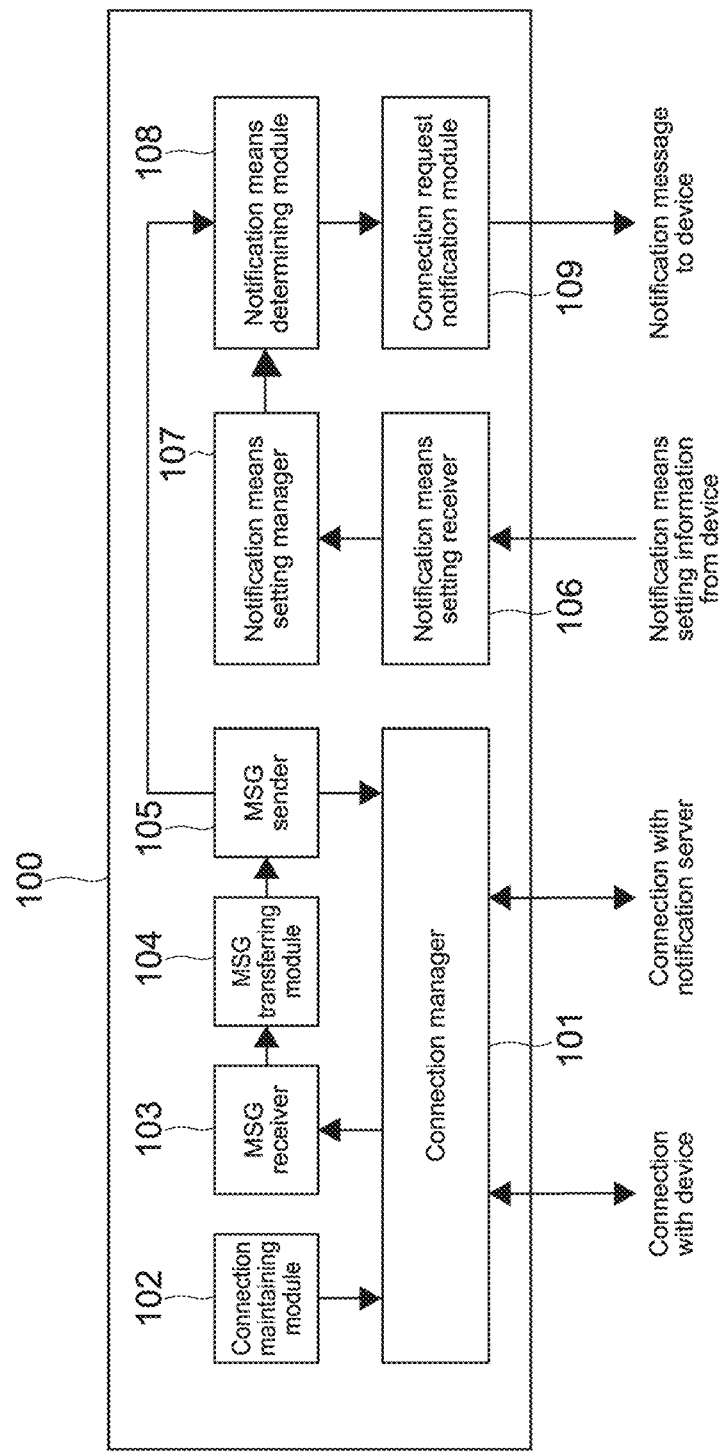
FIG. 12 A diagram showing the configuration of the software modules of a messaging server of a system of the second embodiment.

FIG. 12 is a diagram showing the configuration of the software modules of the messaging server 100 of this embodiment.

As shown in FIG. 12, this embodiment includes additional software modules, i.e., a notification means setting receiver 106, a notification means setting manager 107, a notification means determining module 108, and a connection request notification module 109, in addition to the module configuration (FIG. 4) of the messaging server 100 of the above-mentioned first embodiment.

The notification means setting receiver 106 receives the above-mentioned notification means setting information sent from the device 300.

The notification means setting manager 107 manages the received notification means setting information from the above-mentioned device 300. The storage unit 18 stores the notification means setting information.

When communicating with the device 300, the notification means determining module 108 determines a notification means to be used based on the above-mentioned information managed by the notification means setting manager 107.

The connection request notification module 109 actually sends a notification message to the device 300 based on the above-mentioned notification means determined by the notification means determining module 108.

Further, in this embodiment, the connection manager 101 manages not only connection with the devices 300 but also connection with the notification server 400.

[Software Configuration of Device]

Figure 13:
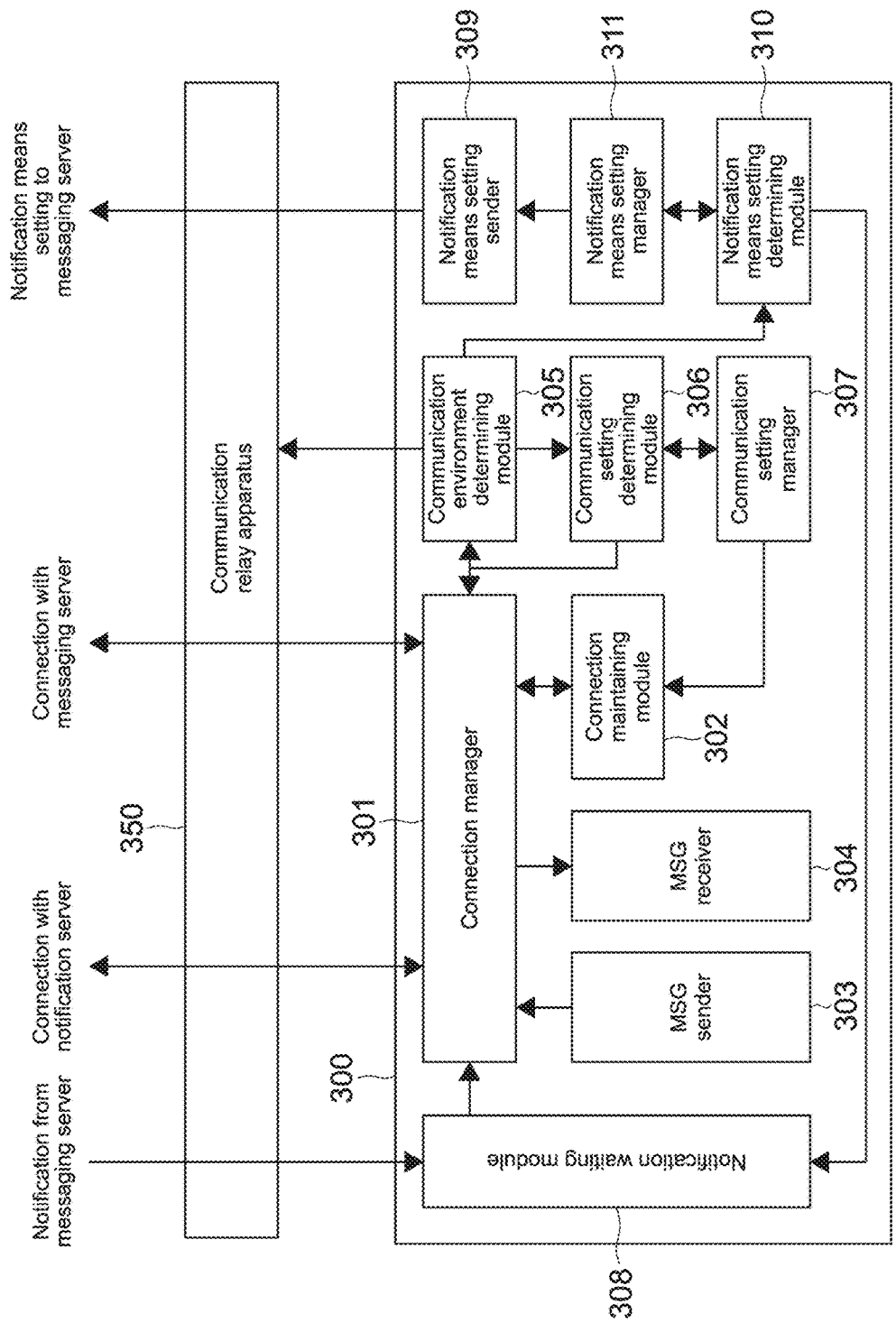
FIG. 13 A diagram showing the configuration of the software modules of a device of the second embodiment.

FIG. 13 is a diagram showing the configuration of the software modules of the device 300 of this embodiment.

As shown in FIG. 13, this embodiment includes a notification waiting module 308, a notification means setting sender 309, a notification means setting determining module 310, and a notification means setting manager 311 in addition to the module configuration (FIG. 5) of the device 300 of the above-mentioned first embodiment.

The notification waiting module 308 waits for a notification message sent from the messaging server 100 or the notification server 400.

The notification means setting determining module 310 determines an appropriate notification means based on the communication environment information on the device 300, and creates or updates notification means setting information.

The notification means setting sender 309 sends the above-mentioned created or updated notification means setting information to the messaging server 100.

The notification means setting manager 311 manages the above-mentioned created or updated notification means setting information.

Further, in this embodiment, the connection manager 301 manages not only connection with the messaging server 100 but also connection with the notification server 400.

[Type of Notification Means and Notification Means Setting Information]

Next, the type of the above-mentioned notification means and the above-mentioned notification means setting information on this embodiment will be described.

FIG. 14 is a diagram showing examples of types of the above-mentioned notification means and notification means additional information corresponding to the types.

As shown in FIG. 14, the notification means types of this embodiment include "Notify Server", "Global IP", "Router UPnP IGD", "Router User Setting", "Proxy Server", "Mail", and "Polling", i.e., the seven types.

"Notify Server" indicates that the messaging server 100 is capable of connecting to the respective devices 300 via the notification server 400. If each device 300 connects to the cloud side via the normal communication relay apparatus 350, which do not support the below-mentioned NAT Traversal mechanism or the like, the notification means is used.

"Global IP" indicates that a global IP address is assigned to the device 300 (for example mobile device), and that the messaging server 100 is capable of directly connecting to the device 300 via no communication relay apparatus 350. The global IP address and the port number of the device 300 are entered as additional information in this entry.

"Router UPnP IGD" indicates that a NAT router (communication relay apparatus 350) is capable of setting transfer of communication from the outside to the internal device 300 in response to an instruction from the device 300 connected to the NAT router, and connecting the messaging server 100 and the device 300 via the communication relay apparatus 350. Specifically, it means the case where a NAT router, i.e., the communication relay apparatus 350 supports NAT Traversal mechanism of UPnP IGD protocol. In this case, the NAT router is set up such that the internal device 300 determines the port number of the WAN 50 side and the port number of the LAN side cooperatively with the messaging server 100 and transfers communication of the port number of the WAN 50 side to the IP address/port number of the LAN side. The messaging server 100 stores the IP address and the port number of the WAN side as additional information, and uses the stored IP address and port number when communicating with the device 300.

"Router User Setting" indicates that it is possible to establish transfer setting similar to "UPnP IGD" not in response to an instruction from the device 300 but manually by a user by means of a port forwarding mechanism. In this case, also, the set IP address and port number are stored as additional information.

"Proxy Server" indicates that the messaging server 100 is capable of communicating with the device 300 via a proxy server at the device 300 side. In this case, the IP address and the port number of the proxy server are stored as additional information.

"Mail" indicates that the messaging server 100 sends notification message to the device 300 by email. In this case, the email address of a user of the device 300 is stored as additional information.

"Polling" indicates that the device 300 polls the messaging server 100 whereby a notification message is sent.

FIG. 15 are diagrams showing examples of the above-mentioned notification means setting information.

FIGS. 15(A), (B), (C), (D), and (E) show examples of the notification means setting information in cases where the notification means types are "Global IP", "Router UPnP IGD", "Proxy Server", "Notify Server", and "Mail", respectively.

As shown in FIG. 15, the notification means setting information includes the following items, i.e., a device ID identifying the device 300 uniquely, a notification means type, notification means additional information, expiration date/time, communication environment information, and priority. The communication environment information is similar to that described in the above-mentioned first embodiment. The priority will be described later.

[Operations of System]

Next, the operations of the messaging server 100 and the device 300 in the system configured as described above will be described.

[Operations of Device]

First, the operations of the device 300 of this embodiment will be described.

(Notification Means Setting Determining Processing)

Figure 16:
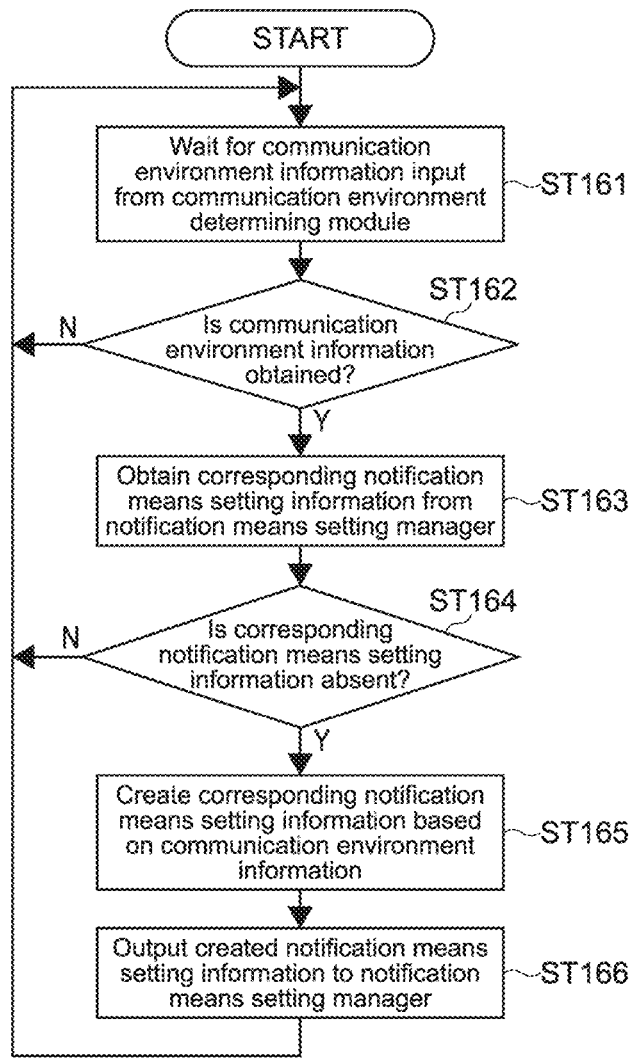
FIG. 16 A flowchart showing the flow of notification means setting determining processing according to the second embodiment.

FIG. 16 is a flowchart showing the flow of notification means setting determining processing of this embodiment.

As shown in FIG. 16, first, the notification means setting determining module 310 of the device 300 waits for communication environment information input from the communication environment determining module 305 (Step 161).

If communication environment information is obtained (Step 162, Yes), the notification means setting determining module 310 obtains notification means setting information corresponding to the communication environment information from the notification means setting manager 311 (Step 163).

Here, if corresponding notification means setting information is absent (Step 164, Yes), the notification means setting determining module 310 creates corresponding notification means setting information based on the above-mentioned communication environment information (Step 165).

Then the notification means setting determining module 310 outputs the created notification means setting information to the above-mentioned notification means setting manager 311 (Step 166).

The above-mentioned notification means setting information is sent from the notification means setting sender 309 to the messaging server 100. If there are a plurality of kinds of notification means setting information to be used, all the notification means setting information is sent to the messaging server 100.

FIG. 17 is a diagram showing a method of creating the above-mentioned notification means setting information.

As shown in FIG. 17, in this embodiment, a notification means and priority are determined fixedly based on a communication environment type.

That is, if the communication environment type is "Global IP", the notification means type is "Global IP" and the priority is 100.

If the communication environment type is NAT Router and UPnP IGD is supported, the notification means type is "Router/UPnP IGD" and the priority is 200.

If the communication environment type is NAT Router and it is possible for a user to establish NAT setting, the notification means type is "Router User Setting" and the priority is 200.

If the communication environment type is NAT Router and NAT setting is not supported, the notification means type is "Notify Server" and the priority is 200.

If the communication environment type is Proxy Server, the notification means type is "Notify Server" and the priority is 200.

If the communication environment type is different from those described above and notification by means of polling is supported, the notification means type is "Polling" and the priority is 300.

If the communication environment type is different from those described above and notification by email is supported, the notification means type is "Mail" and the priority is 500.

As described below, the messaging server 100 uses the priority as a criterion for selecting one of a plurality of available notification means. The smaller the number, the higher the priority.

However, as a method of creating notification means setting information (method of determining notification means and priority), any method may be employed as long as appropriate information on a notification means and priority is created based on communication environment information.

[Operations of Messaging Server]

Next, the operations of the messaging server 100 of this embodiment will be described.

(Message Transfer Processing)

Figure 18:
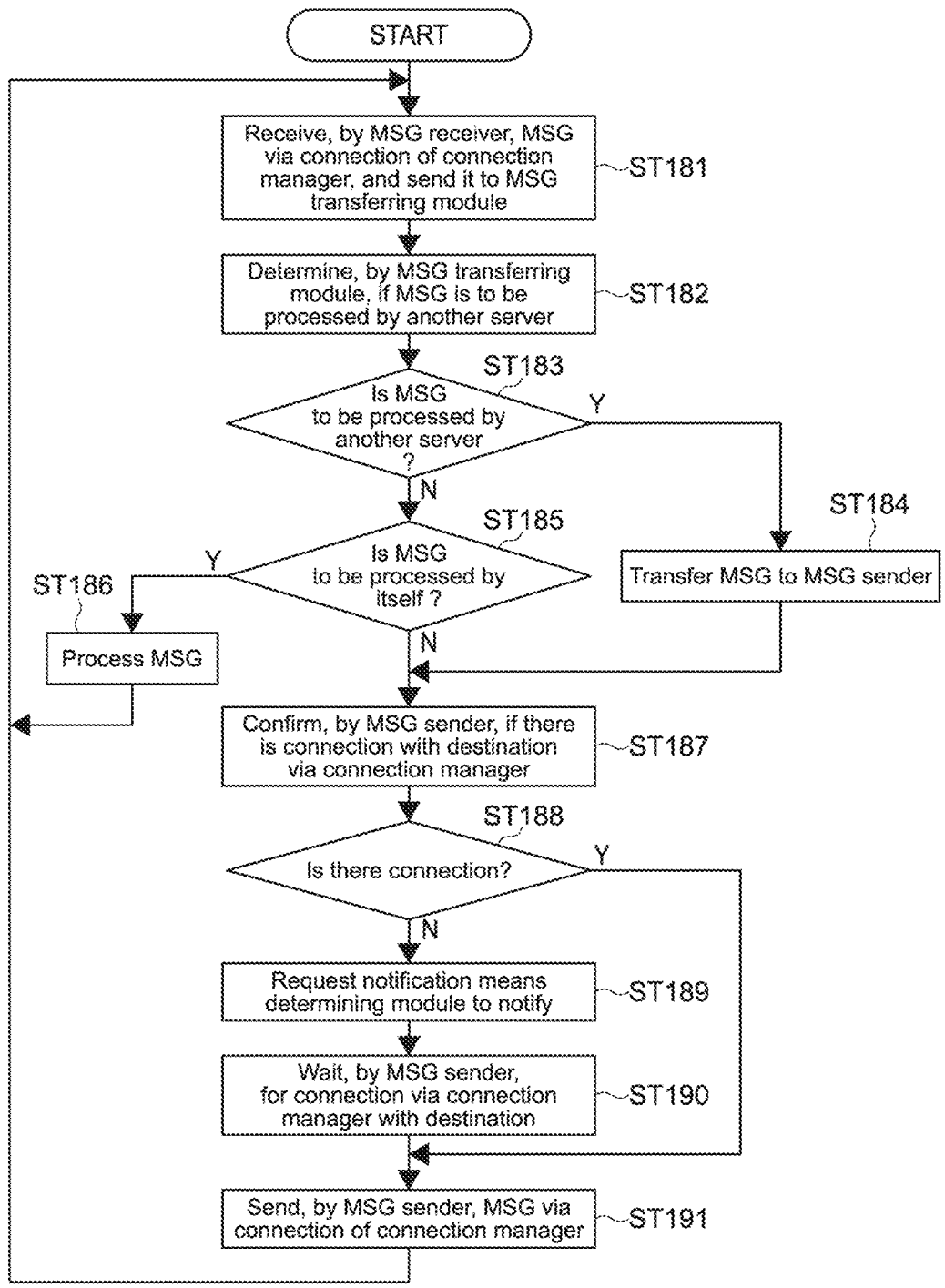
FIG. 18 A flowchart showing the flow of message transfer processing performed by a messaging server of the second embodiment.

FIG. 18 is a flowchart showing the flow of message transfer processing performed by the messaging server 100.

First, the message receiver 103 of the messaging server 100 receives a message from the device 300 (300A) via the connection of the connection manager 101 (Step 181).

Then the message transferring module 104 determines if the message is to be processed by another messaging server or not (Step 182).

If it is determined that the above-mentioned message is a message to be processed by another messaging server (Yes), the message transferring module 104 transfers the message to the message sender 105 (Step 184).

If it is determined that the above-mentioned message is not a message to be processed by another messaging server (No), the message transferring module 104 determines if the message is a message (intended for messaging server 100) to be processed by itself (messaging server 100) or not (Step 185).

If it is determined that the above-mentioned message is a message to be processed by the messaging server 100 (Yes), the message transferring module 104 processes the message (Step 186).

If it is determined that the above-mentioned message is not a message to be processed by the messaging server 100 (is message intended for another device 300 (300B)) (No), the message sender 105 confirms if there is connection with the device 300 B, i.e., the message destination, or not via the connection manager 101 (Step 187).

If it is determined that there is no connection with the device 300B, i.e., the message destination (No), the message sender 105 requests the notification means determining module 108 to send a notification message about the above-mentioned message (Step 189). As a result, the notification means determining module 108 executes the below-mentioned notification means determining processing.

Then the message sender 105 waits for connection via the connection manager 101 with the device 300B, i.e., the message destination, to be established (Step 190).

Then the message sender 105 sends the above-mentioned message to the device 300B, i.e., the destination, via connection of the connection manager 101 (Step 191).

(Notification Means Determining Processing)

Figure 19:
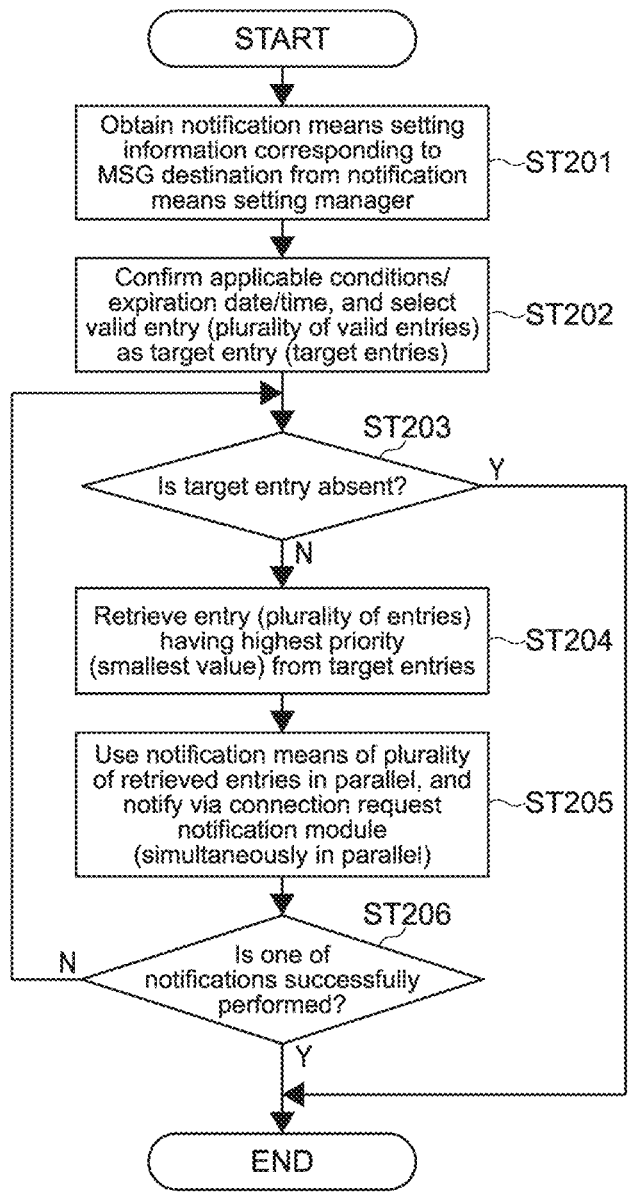
FIG. 19 A flowchart showing the flow of notification means determining processing performed by the messaging server of the second embodiment.

FIG. 19 is a flowchart showing the flow of notification means determining processing performed by the messaging server 100.

As shown in FIG. 19, the notification means determining module 108 obtains notification means setting information corresponding to the device 300, i.e., the message destination, from the notification means setting manager 107 (Step 201).

Then the notification means determining module 108 confirms the applicable conditions and the expiration date/time of the above-mentioned notification means setting information on FIG. 15, and selects a valid entry (or a plurality of valid entries) as a target entry (target entries) (Step 202).

Here, if there is no target entry (Step 203, Yes), the notification means determining module 108 terminates the processing.

If there is a target entry (Step 203, No), the notification means determining module 108 retrieves an entry (or a plurality of entries) having the highest priority (smallest value) from the above-mentioned notification means setting information (Step 204).

The notification means determining module 108 uses the notification means of the plurality of retrieved entries in parallel, and sends notification messages via the connection request notification module 109 by means of simultaneous parallel processing (Step 205).

Then the notification means determining module 108 determines if one of the above-mentioned plurality of sending processes is successfully performed or not (Step 206), and terminates the process if any process is successfully performed (Yes) or repeats the above-mentioned processes of Step 203 and thereafter if no process is successfully performed (No).

[Conclusion]

As described above, according to this embodiment, the device 300 previously sends a plurality of pieces of notification means setting information to the messaging server 100, and the messaging server 100 combines the notification means and sends a notification message. As a result, because it is not necessary to communicate with the device 300 to change a notification means every time the device 300 is transferred, it is possible to prevent a load from being put on the messaging server 100 because of such communication.

That is, if a notification means is changed because the device 300 is transferred, since the messaging server 100 executes a plurality of preinformed notification means in parallel, the device 300 does not send new notification means setting information. It is only necessary for the device 300 to send new notification means setting information to the messaging server 100 only when a completely new communication environment is added or when it is necessary to change the existing notification means setting.

Third Embodiment

Next, a third embodiment of the present technology will be described. In this embodiment, unless otherwise stated, the configuration is similar to the configuration of the above-mentioned first and second embodiments. Further, in this embodiment, the functions and configurations similar to the functions and configurations of the above-mentioned first and second embodiments will be denoted by the similar reference symbols, and description thereof will be omitted or simplified.

Figure 20:
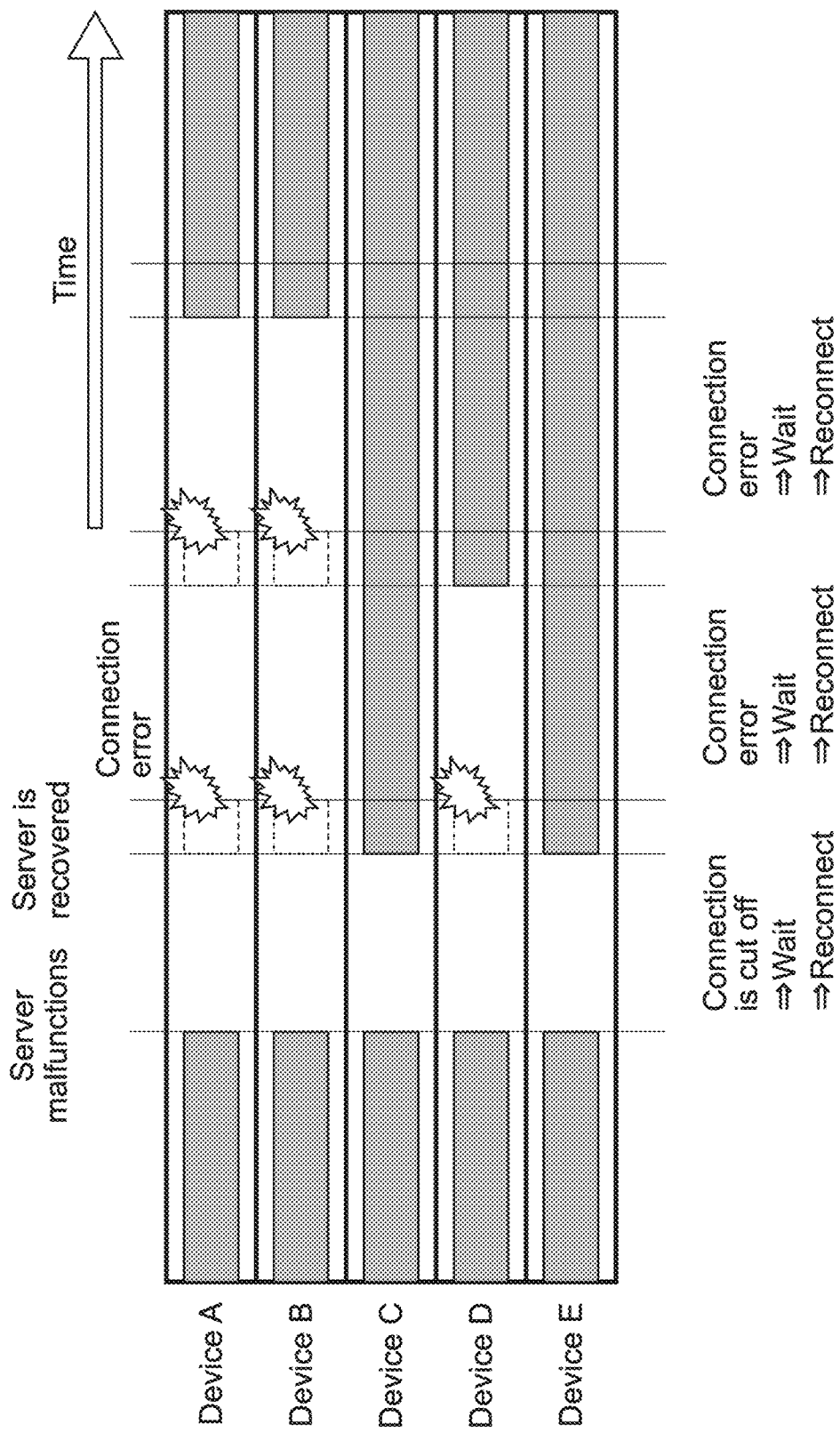
FIG. 20 A diagram showing an example in which the respective devices reconnect to the messaging server at the same time in a case where the constant connection between the plurality of devices and the messaging server is cut off.
Figure 21:
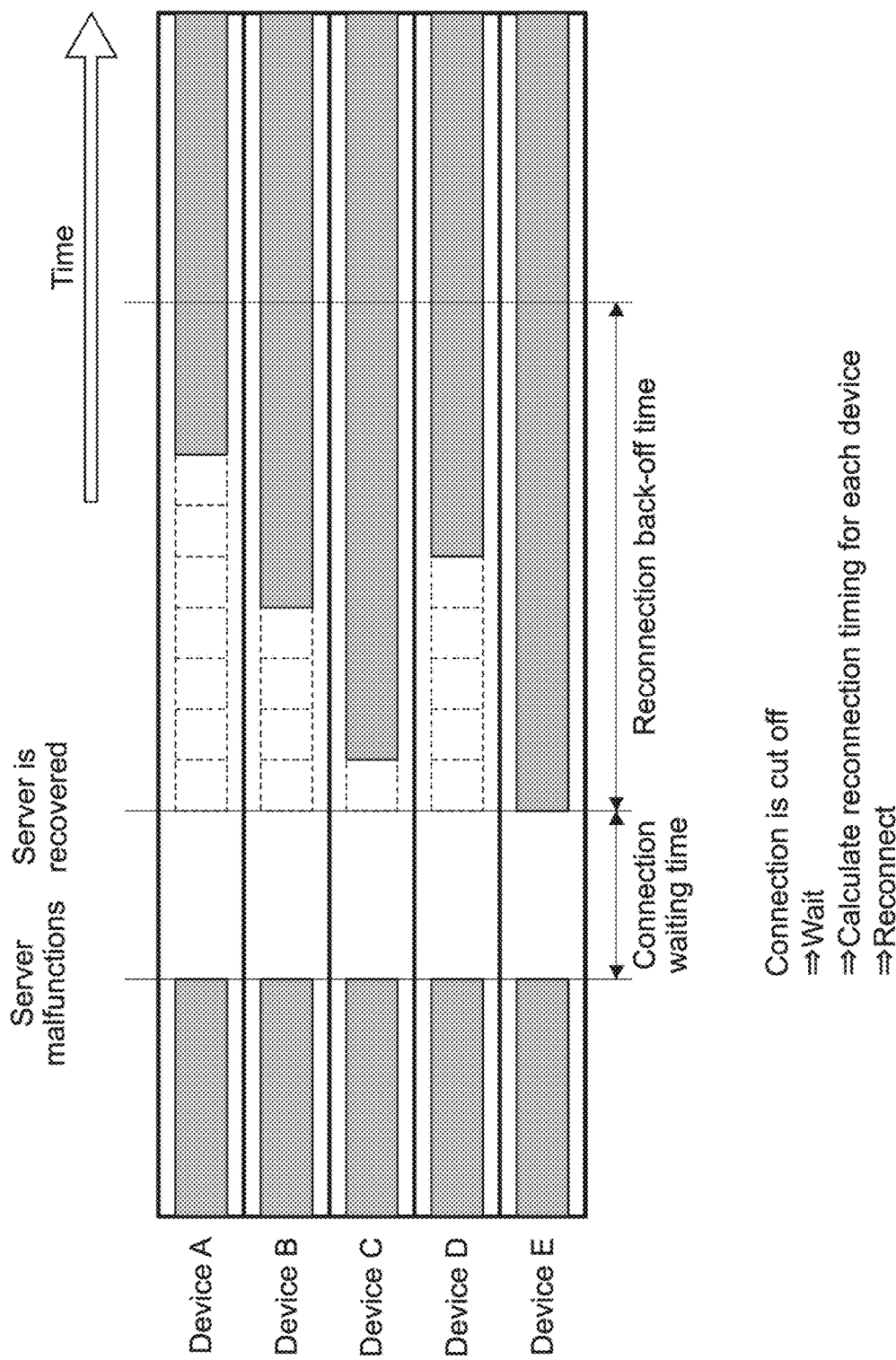
FIG. 21 A diagram showing an example in which the respective devices reconnect to the messaging server at different times in a case where the constant connection between the plurality of devices and the messaging server is cut off.

FIG. 20 is a diagram showing an example in which the respective devices 300 reconnect to the messaging server 100 at the same time in a case where the constant connection between the plurality of devices 300 and the messaging server 100 is cut off. FIG. 21 is a diagram showing an example in which the respective devices 300 reconnect to the messaging server 100 at different times in a case where the constant connection between the plurality of devices 300 and the messaging server 100 is cut off.

According to the above-mentioned first embodiment, the constant connection between the messaging server 100 and the devices 300 is maintained by means of Keep Alive communication. However, if the messaging server 100 malfunctions, the constant connection between the messaging server 100 and the devices 300 is completely cut off.

In this case, as shown in FIG. 20, if the respective devices 300 waits for the server to be recovered and then starts reconnection processing, and if the messaging server 100 supports simultaneous connection with a huge number of devices, the reconnection processing is converged. Then the messaging server 100 delays in connection establishing processing, and connection errors occur.

Then, the respective devices 300 wait a predetermined period of time and try to reconnect to the messaging server 100 again, but here the respective devices 300 try to connect to the messaging server 100 at the same time, and further connection errors occur again and again.

Meanwhile, as shown in FIG. 21, if the respective devices 300 use a mechanism of randomly selecting reconnecting timing for each device 300 within a predetermined period of reconnection waiting time, it is possible to solve the above-mentioned problem of FIG. 20.

However, if the number of the devices 300, which always connect to the messaging server 100, does not change, it is easy to appropriately set the reconnection waiting time. However, under the environment in which a large number of devices 300 are transferred and the connection modes are changed, values to be set are always changed, and it may thus be difficult to set reconnection waiting time.

In view of this, according to this embodiment, depending on the constant connection status with the devices 300, the messaging server 100 recalculates reconnection waiting time and notifies the respective device 300.

Information on the above-mentioned reconnection waiting time is, for example, written in an ACK packet in response to a Keep Alive packet sent from each device 300.

Figure 22:
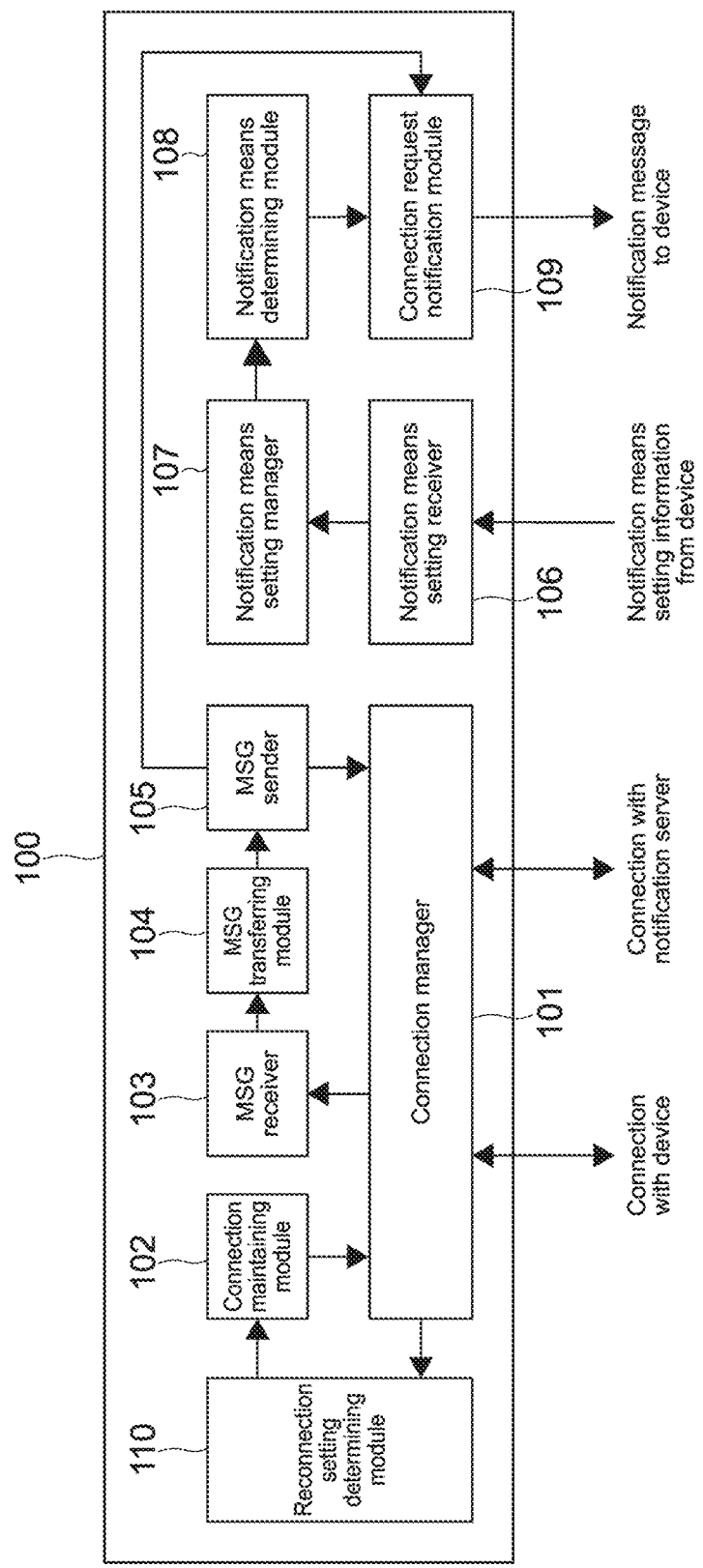
FIG. 22 A diagram showing the configuration of the software modules of a messaging server of a system of a third embodiment.

FIG. 22 is a diagram showing the configuration of the software modules of the messaging server 100 of the system of this embodiment.

As shown in FIG. 22, this embodiment includes the reconnection setting determining module 110 in addition to the module configuration (FIG. 12) of the messaging server 100 of the above-mentioned second embodiment.

The reconnection setting determining module 110 periodically obtains information on constant connection of the messaging server 100 from the connection manager 101, determines appropriate reconnection waiting time, and notifies the device 300 of the reconnection waiting time via the connection maintaining module 102.

Figure 23:
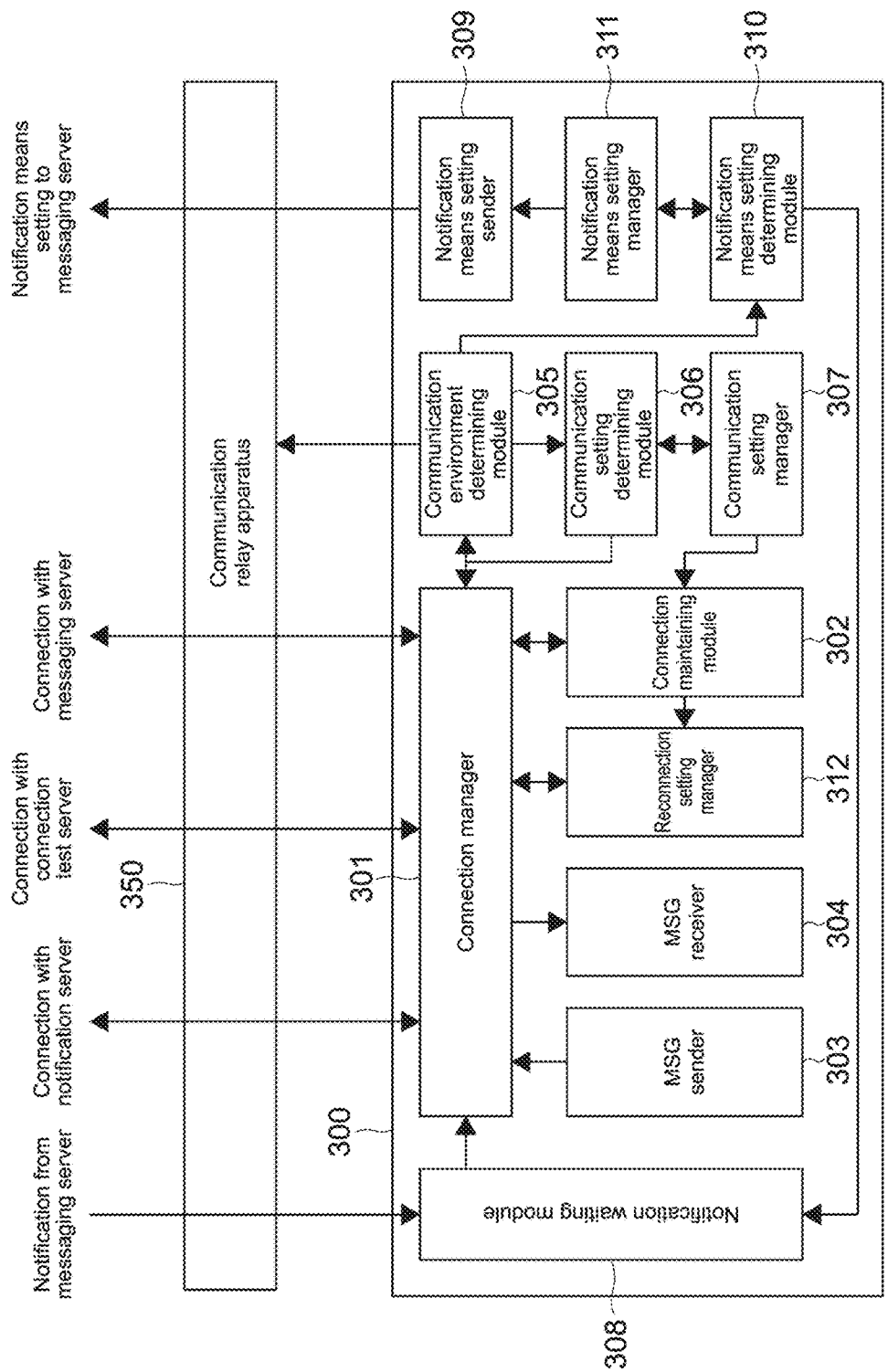
FIG. 23 A diagram showing the configuration of the software modules of a device of the system of the third embodiment.

FIG. 23 is a diagram showing the configuration of the software modules of the device 300 of the system of this embodiment.

As shown in FIG. 23, this embodiment includes a reconnection setting manager 312 in addition to the module configuration (FIG. 13) of the device 300 of the above-mentioned second embodiment.

The reconnection setting manager 312 manages reconnection setting obtained via the connection maintaining module 302, and sets the connection manager 301. The reconnection setting information is stored in the above-mentioned storage unit 38, and is updated every time the newest reconnection setting information from the messaging server 100 is received.

[Operations of System]

Next, operations of the messaging server 100 and the device 300 in the system configured as described above will be described.

[Operations of Device]

First, operations of the device 300 of this embodiment will be described.

(Reconnection Setting Process)

Figure 24:
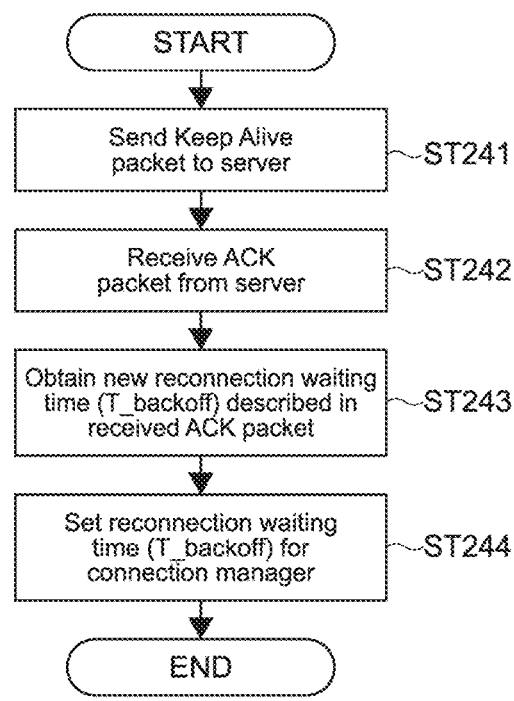
FIG. 24 A flowchart showing the flow of reconnection setting process performed by the device of the third embodiment.

FIG. 24 is a flowchart showing the flow of reconnection setting process performed by the device 300.

As shown in FIG. 24, the connection maintaining module 302 of the device 300 sends Keep Alive packets to the messaging server 100 at the sending interval shown in the above-mentioned first embodiment (Step 241).

Then the connection maintaining module 302 receives ACK packets from the messaging server 100 in response to the above-mentioned Keep Alive packets (Step 242).

Then the connection maintaining module 302 obtains new reconnection waiting time information (T_backoff) described in the above-mentioned ACK packet (Step 243).

Then the connection maintaining module 302 sets the obtained reconnection waiting time information (T_backoff) for the connection manager 101 (Step 244).

(Reconnection Processing)

Figure 25:
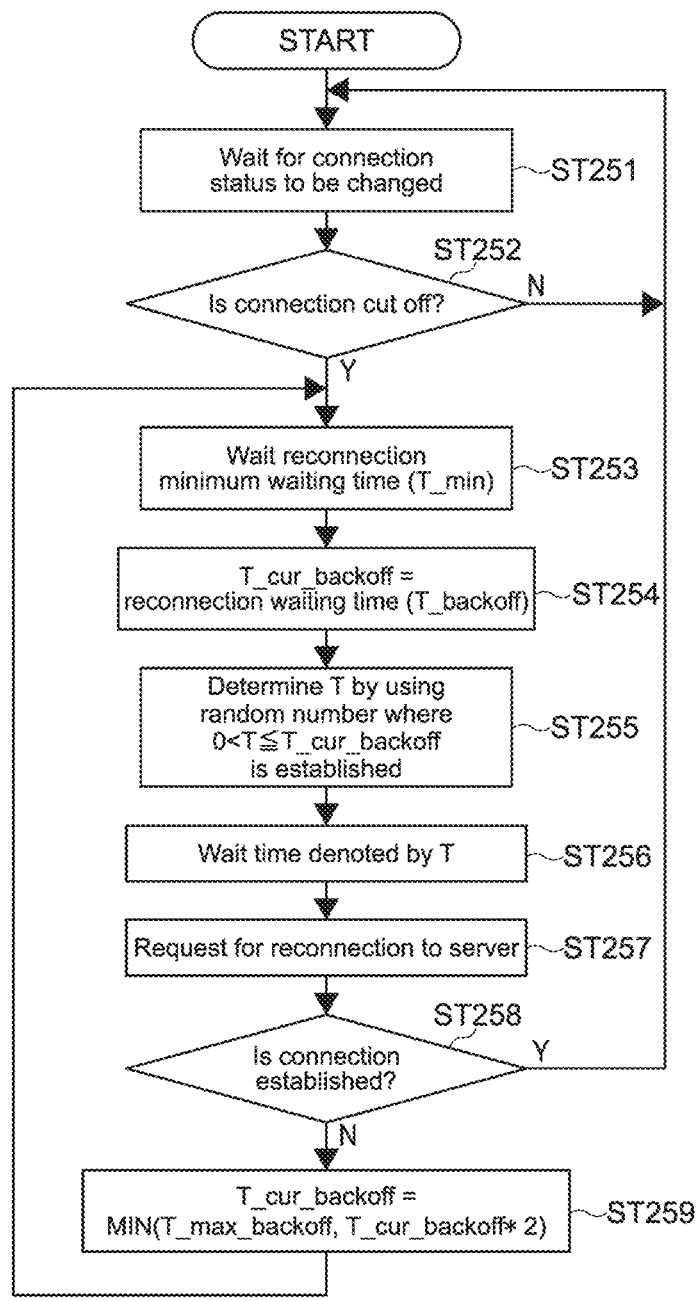
FIG. 25 A flowchart showing the flow of reconnection processing performed by the device of the third embodiment.

FIG. 25 is a flowchart showing the flow of reconnection processing performed by the device 300.

As shown in FIG. 25, first, the connection manager 101 of the device 300 waits for the connection status with the messaging server 100 to be changed (Step 251).

Then the connection manager 101 determines if connection with the messaging server 100 is cut off or not (Step 252).

If it is determined that the above-mentioned connection is cut off (Yes), the connection manager 101 waits a reconnection minimum waiting time (T_min) (Step 253). The reconnection minimum waiting time (T_min) is determined commonly for the respective devices 300.

Then the connection manager 101 sets the reconnection waiting time information (T_backoff) obtained from the above-mentioned messaging server 100 as the newest reconnection waiting time (T_cur_backoff) (Step 254).

Then the connection manager 101 determines T by using a random number where 0<T≤T_cur_backoff is established (Step 255).

Then the connection manager 101 waits a time denoted by the above-mentioned T (Step 256), and requests for reconnection to the messaging server 100 (Step 257).

Then the connection manager 101 determines if connection with the messaging server 100 is established or not (Step 258).

If the above-mentioned connection is not established (No), the connection manager 101 sets the smaller one of T_max_backoff and T_cur_back*2 as the newest reconnection waiting time (T_cur_backoff) (Step 259), and repeats the processing of the above-mentioned Step 253 and thereafter. Here, T_max_backoff is the maximum reconnection waiting time preset for the device 300.

[Operations of Messaging Server]

Next, the operations of the messaging server 100 of this embodiment will be described.

(Reconnection Setting Determining Processing)

Figure 26:
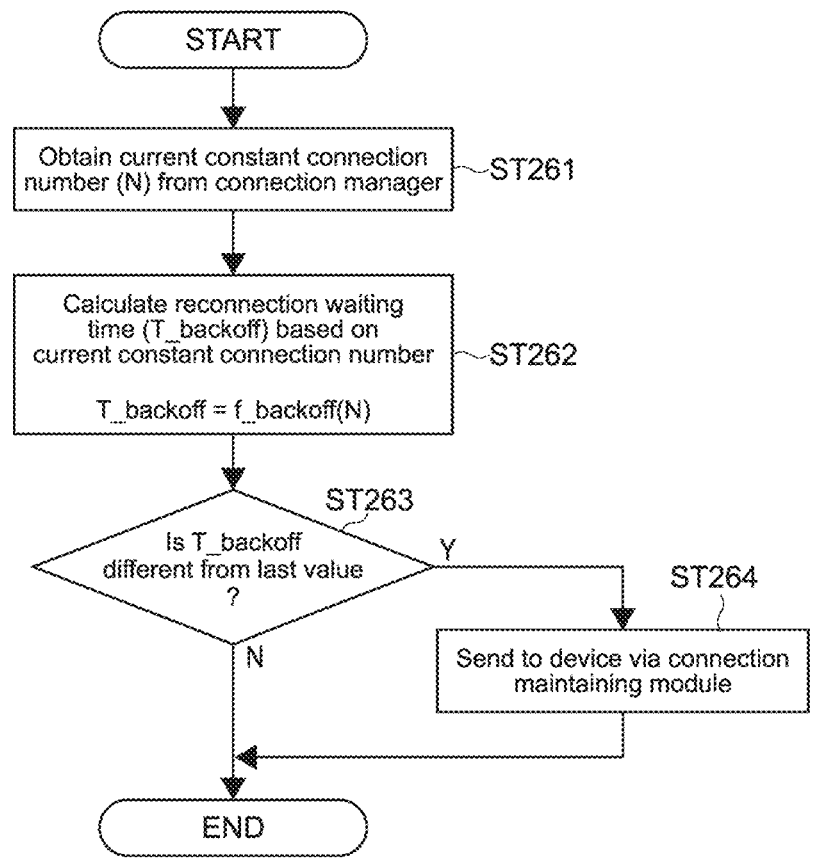
FIG. 26 A flowchart showing the flow of the reconnection setting determining processing performed by a messaging server of the third embodiment.

FIG. 26 is a flowchart showing the flow of the reconnection setting determining processing performed by the messaging server 100.

As shown in FIG. 26, the reconnection setting determining module 110 of the messaging server 100 obtains the current constant connection number (N) of the devices 300 from the connection manager 101 (Step 261).

Then the reconnection setting determining module 110 calculates the reconnection waiting time (T_backoff) based on the current constant connection number (N) by using the following formula.

$$T\_backoff = f\_backoff(N)$$

Here, for example, f_backoff(N) is calculated based on a connection start request (N_max_conn_req) indicating processability by the messaging server 100 in each unit time by using the following formula.

$$f\_backoff(N) = N/N\_max\_conn\_req$$

Then the reconnection setting determining module 110 determines if the calculated T_backoff is different from the last value or not (Step 263).

If it is determined that T_backoff is different from the last value, the reconnection setting determining module 110 writes the reconnection waiting time (T_backoff) in ACK corresponding to the above-mentioned Keep Alive packet, and sends the ACK to the device 300 via the connection maintaining module 302.

[Conclusion]

As described above, according to this embodiment, if the messaging server 100 malfunctions, the messaging server 100 determines setting for reconnection based on the connection statuses of all the devices 300 at this time, and notifies the respective devices 300. As a result, it is possible to prevent reconnection of the devices 300 from being converged after the messaging server 100 recovers, and prevent connection malfunction from further occurring.

Further, as a result, the messaging server 100 is capable of preventing communication error from occurring depending on the number of the devices 300, which are to reconnect to the messaging server 100 after malfunctioning messaging server 100 is recovered, and the respective devices 300 are capable of establishing normal connection statuses in an appropriate reconnection time.

Further, the messaging server 100 writes a reconnection waiting time in ACK in response to a Keep Alive packet sent for maintaining connection from each device 300. That is, because communication is not newly performed only to notify of a reconnection waiting time, even under the environment in which there are a large number of devices 300 being transferred such as mobile devices, the most appropriately-set connections are recovered even when malfunction occurs without increasing the usual communication load.

Examples

The present technology is not limited to the above-mentioned embodiments, but may be variously changed within the gist of the present technology.

According to the above-mentioned first embodiment, only one connection test server 200 is shown in the cloud (FIG. 1), but a plurality of connection test servers 200 may be provided, or a connection test server 200 dedicated to each device 300 may be predetermined.

According to the above-mentioned second embodiment, if the messaging server 100 is capable of using a plurality of notification means, the messaging server 100 executes notification means having the highest priority in parallel at the same time. However, the messaging server 100 may execute a plurality of notification means in order without depending on priority, or all the notification means in parallel at the same time.

According to the above-mentioned third embodiment, information on reconnection waiting time is written in an ACK packet corresponding to a Keep Alive packet, but the information may be sent independent of the ACK.

According to the above-mentioned third embodiment, the messaging server 100 obtains the constant connection number (N) of the devices 300 at the time from the connection manager 101, and calculates f_backoff(N) based on a connection start request (N_max_conn_req) indicating processability by the messaging server 100 in each unit time. However, any information on connection obtained from the connection manager 101 may be used, and any calculation formula f_backoff( ) for calculating T_backoff based thereon may be used.

According to the above-mentioned respective embodiments, the message sender 303 and the message receiver 304 of each device 300 are separate modules, but one shared connection module may be employed.

According to the above-mentioned respective embodiments, a device 300 sends/receives messages to/from another device 300 via the messaging server 100 without exception. However, based on the message mechanism, communication mechanisms such as an RPC (Remote Procedure Call) mechanism, a stream communication mechanism, and further HTTP emulation may be provided to application software of each device 300.

According to the above-mentioned second embodiment, the messaging server 100 is a server physically different from the notification server 400. However, because the differences between them are based on buffer sizes and ways to treat connection with the respective devices 300, the following modes lead to the similar effect even if the physically-different servers do not execute processes.

(1) A single server machine executes both the process of the notification server and the process of the messaging server.

(2) A single server machine executes one server process including the function of the notification server and the function of the messaging server (to change between the connection mode corresponding to the notification server and the connection mode corresponding to the messaging server depending on the communication status with the device 300).

The respective technologies of the above-mentioned first to third embodiments may be executed independently, and may be combined and executed freely in so far as it is not incompatible with one another.

[Note]

The present technology may employ the following configurations.

(1) An information processing apparatus, comprising:

a communication unit capable of communicating with another information processing apparatus via a relay server in a network; and a controller capable of obtaining communication environment information indicating a communication environment of the communication unit, the communication environment information including attribute information on a communication relay apparatus relaying communication between the communication unit and the relay server,
capable of calculating a sending interval to send maintenance signals to maintain connection with the relay server based on the obtained communication environment information, and
capable of controlling the communication unit to send the maintenance signals to the relay server at the calculated sending interval.

(2) The information processing apparatus according to the above-mentioned item (1), wherein
after the communication unit connects to the relay server, if the communication relay apparatus cuts off the connection, the controller calculates duration time between the connection and the cutoff, and calculates the sending interval of the maintenance signals based on the calculated duration time.

(3) The information processing apparatus according to the above-mentioned item (1) or (2), wherein
the communication unit is capable of communicating with a connection test server in the network, and
after the communication unit connects to the connection test server, if the communication relay apparatus cuts off the connection, the controller calculates duration time between the connection and the cutoff, and calculates the sending interval of the maintenance signals based on the calculated duration time.

(4) The information processing apparatus according to any one of the above-mentioned items (1) to (3), wherein
the communication unit is capable of receiving, from the relay server, notification message notifying of existence of data sent from the other information processing apparatus to the information processing apparatus,
the controller is capable of creating setting information to be set in order that the relay server connect to the information processing apparatus and send the notification message depending on the communication environment, and capable of controlling the communication unit to send the created setting information to the relay server, and
the relay server stores the sent setting information, and sends the notification message based on the stored setting information.

(5) The information processing apparatus according to the above-mentioned item (4), wherein
the controller is capable of updating the created setting information depending on a change of the communication environment, and capable of controlling the communication unit to send the updated setting information to the relay server, and
the relay server updates the stored setting information with the updated and sent setting information.

(6) The information processing apparatus according to one of the above-mentioned item (4) or (5), wherein
the controller is
capable of previously creating the plurality of pieces of setting information to be created depending on a change of the communication environment,
capable of controlling the communication unit to send the plurality of pieces of created setting information to the relay server,
capable of creating, if the communication environment is changed and if none of the plurality of pieces of sent setting information corresponds to the communication environment after the change, new setting information corresponding to the communication environment after the change, and
capable of controlling the communication unit to send the created new setting information to the relay server, and
the relay server stores the plurality of pieces of sent setting information, and sends the notification message based on at least one of the plurality of pieces of stored setting information.

(7) The information processing apparatus according to any one of the above-mentioned items (1) to (6), further comprising:
a storage unit, wherein
the communication unit is capable of periodically receiving, from the relay server, reconnection information on timing when the information processing apparatus reconnects to the relay server if connection between the information processing apparatus and the relay server is cut off, the reconnection information being created depending on the number of a plurality of information processing apparatuses connected to the relay server including the information processing apparatus, and
the controller is
capable of controlling the storage unit to store the newest reconnection information out of the periodically-received reconnection information, and
capable of controlling the communication unit to reconnect to the relay server based on the stored reconnection information if connection between the information processing apparatus and the relay server is cut off.

(8) The information processing apparatus according to the above-mentioned item (7), wherein
the communication unit receives, as the reconnection information, information on maximum waiting time between the cutoff and the reconnection, and
the controller
determines waiting time within the maximum waiting time based on a random number, and
controls the communication unit to reconnect to the relay server after the determined waiting time passes.

(9) The information processing apparatus according to the above-mentioned item (8), wherein
the relay server replies ACK including information concerning the maximum waiting time in response to the sent maintenance signal,
the communication unit receives the ACK, and
the controller obtains the information concerning the maximum waiting time from the received ACK.

DESCRIPTION OF SYMBOLS

11, 21, 31 CPU
18, 28, 38 storage unit
19, 29, 39 communication unit
50 WAN
100 messaging server
101 connection manager
102 connection maintaining module
103 message receiver
104 message transferring module
105 message sender
106 notification means setting receiver
107 notification means setting manager
108 notification means determining module
109 connection request notification module
110 reconnection setting determining module
200 connection test server
300 (300A, 300B) device 301 connection manager
302 connection maintaining module
303 message sender
304 message receiver
305 communication environment determining module
306 communication setting determining module
307 communication setting manager
308 notification waiting module
309 notification means setting sender
310 notification means setting determining module
311 notification means setting manager
312 reconnection setting manager
350 (350A, 350B) communication relay apparatus
400 notification server

The invention claimed is:

1. A first information processing apparatus, comprising:
a storage unit;
a communication unit configured to communicate with a second information processing apparatus via a communication relay apparatus and a relay server in a network, wherein the communication relay apparatus relays communication between the communication unit and the relay server; and
a controller configured to:
obtain first communication environment information that indicates a communication environment of the communication unit;
calculate, based on the first communication environment information, a first sending interval to transmit maintenance signals to maintain connection with the relay server;
control the communication unit to transmit the maintenance signals to the relay server at the first sending interval;
determine the connection with the relay server is cut off;
determine a connection duration of the connection with the relay server based on a current time at which the connection with the relay server is cut off;
calculate a second sending interval to transmit the maintenance signals to the relay server, wherein
the calculation of the second sending interval is based on the connection duration of the connection with the relay server, and
the calculated second sending interval is less than or equal to the connection duration of the connection with the relay server; and
control the communication unit to transmit the maintenance signals to the relay server at the second sending interval, wherein
the communication unit is further configured to periodically receive reconnection information from the relay server based on the transmission of the maintenance signals at the second sending interval and the cut off of the connection between the first information processing apparatus and the relay server,
the reconnection information is related to a time at which the first information processing apparatus reconnects to the relay server,
the reconnection information is based on a number of a plurality of information processing apparatuses connected to the relay server,
the plurality of information processing apparatuses includes the first information processing apparatus,
the reconnection information indicates a maximum waiting time between the cut off of the connection and the reconnection to the relay server, and
the controller is further configured to:
control the storage unit to store reconnection setting information that is latest among the periodically received reconnection information;
determine a first waiting time within the maximum waiting time based on a random number; and
control the communication unit to reconnect to the relay server based on the first waiting time that has passed, the stored reconnection setting information, and the cut off of the connection between the first information processing apparatus and the relay server.

2. The first information processing apparatus according to claim 1, wherein
the communication unit is further configured to communicate with a connection test server in the network, and
based on a cut off of an established connection between the communication unit and the connection test server by the communication relay apparatus, the controller is further configured to:
calculate a time duration of the connection with the connection test server; and
calculate the second sending interval to transmit the maintenance signals based on the calculated time duration.

3. The first information processing apparatus according to claim 1, wherein
the controller is further configured to:
generate, based on the first communication environment information, first notification setting information that indicates at least one notification technique to send a notification message to the first information processing apparatus; and
control the communication unit to transmit the first notification setting information to the relay server,
the communication unit is further configured to receive from the relay server, the notification message, and
the received notification message notifies of existence of data sent from the second information processing apparatus to the first information processing apparatus.

4. The first information processing apparatus according to claim 3, wherein the controller is further configured to:
update the generated first notification setting information based on a change of the communication environment; and
control the communication unit to transmit the updated first notification setting information to the relay server.

5. The first information processing apparatus according to claim 3, wherein
the controller is further configured to:
generate a plurality of pieces of the first notification setting information based on a change of the communication environment to a new communication environment;
obtain second communication environment information that corresponds to the new communication environment;
control the communication unit to transmit the plurality of pieces of the first notification setting information to the relay server;
generate second notification setting information that corresponds to the new communication environment based on the second communication environment information that corresponds to none of the plurality of pieces of the first notification setting information; and control the communication unit to transmit the generated second notification setting information to the relay server, and the communication unit is further configured to receive the notification message based on one of the second notification setting information, or at least one of the plurality of pieces of the first notification setting information.

6. The first information processing apparatus according to claim 1, wherein the communication unit is further configured to receive an acknowledgement (ACK) that corresponds to the maximum waiting time based on the maintenance signals.

7. An information processing system, comprising:
a first information processing apparatus and a second information processing apparatus, wherein
the first information processing apparatus includes:
a storage unit;
a first communication unit configured to communicate with a third information processing apparatus via the second information processing apparatus; and
a first controller configured to:
obtain communication environment information that indicates a communication environment of the first communication unit;
calculate, based on the communication environment information, a first sending interval to transmit a maintenance signal to maintain connection with the second information processing apparatus;
control the first communication unit to transmit the maintenance signal to the second information processing apparatus at the first sending interval;
determine the connection with the second information processing apparatus is cut off;
determine a connection duration of the connection with the second information processing apparatus based on a current time at which the connection with the second information processing apparatus is cut off;
calculate a second sending interval to transmit the maintenance signal to the second information processing apparatus, wherein
the calculation of the second sending interval is based on the connection duration of the connection with the second information processing apparatus, and
the calculated second sending interval is less than or equal to the connection duration of the connection with the second information processing apparatus; and
control the first communication unit to transmit the maintenance signal to the second information processing apparatus at the second sending interval, and the second information processing apparatus includes:
a second communication unit configured to relay communication between the first information processing apparatus and the third information processing apparatus based on communication with the first communication unit; and
a second controller configured to control the second communication unit to:
receive the maintenance signal from the first information processing apparatus; and transmit an acknowledgement (ACK) to the first information processing apparatus based on the maintenance signal, wherein
the first communication unit is further configured to periodically receive reconnection information from the second communication unit based on the transmission of the maintenance signal at the second sending interval and the cut off of the connection between the first information processing apparatus and the second information processing apparatus,
the reconnection information is related to a time at which the first information processing apparatus reconnects to the second information processing apparatus,
the reconnection information is based on a number of a plurality of information processing apparatuses connected to the second information processing apparatus,
the plurality of information processing apparatuses includes the first information processing apparatus,
the reconnection information indicates a maximum waiting time between the cut off of the connection and the reconnection to the second information processing apparatus, and
the first controller is further configured to:
control the storage unit to store reconnection setting information that is latest among the periodically received reconnection information;
determine a waiting time within the maximum waiting time based on a random number; and
control the first communication unit to reconnect to the second information processing apparatus based on the waiting time that has passed, the stored reconnection setting information, and the cut off of the connection between the first information processing apparatus and the second information processing apparatus.

8. An information processing method, comprising:
in a first information processing apparatus that includes a storage unit, a communication unit, and a controller:
obtaining, by the controller, communication environment information that indicates a communication environment of the first information processing apparatus,
wherein the first information processing apparatus is configured to communicate with a second information processing apparatus via a communication relay apparatus and a relay server in a network;
calculating, by the controller, based on the communication environment information, a first sending interval to transmit maintenance signals to maintain connection with the relay server;
transmitting, by the communication unit, the maintenance signals to the relay server at the first sending interval;
determining, by the controller, the connection with the relay server is cut off;
determining, by the controller, a connection duration of the connection with the relay server based on a current time at which the connection with the relay server is cut off;
calculating, by the controller, a second sending interval to transmit the maintenance signals to the relay server, wherein the calculation of the second sending interval is based on the connection duration of the connection with the relay server, and the calculated second sending interval is less than or equal to the connection duration of the connection with the relay server;

transmitting, by the communication unit, the maintenance signals to the relay server at the second sending interval;

periodically receiving, by the communication unit, reconnection information from the relay server based on the transmission of the maintenance signals at the second sending interval and the cut off of the connection between the first information processing apparatus and the relay server, wherein the reconnection information is related to a time at which the first information processing apparatus reconnects to the relay server, the reconnection information is based on a number of a plurality of information processing apparatuses connected to the relay server, the plurality of information processing apparatuses includes the first information processing apparatus, and the reconnection information indicates a maximum waiting time between the cut off of the connection and the reconnection to the relay server;

storing, in the storage unit, reconnection setting information that is latest among the periodically received reconnection information;

determining, by the controller, a waiting time within the maximum waiting time based on a random number; and controlling, by the controller, the communication unit to reconnect to the relay server based on the waiting time that has passed, the stored reconnection setting information, and the cut off of the connection between the first information processing apparatus and the relay server.

9. A non-transitory computer-readable medium having stored thereon, computer executable instructions that, when executed by a processor of a first information processing apparatus, cause the processor to execute operations, the operations comprising:

obtaining communication environment information indicating a communication environment of the first information processing apparatus, wherein the first information processing apparatus is configured to communicate with a second information processing apparatus via a communication relay apparatus and a relay server in a network;

calculating, based on the communication environment information, a first sending interval to transmit maintenance signals to maintain connection with the relay server;

controlling a communication unit of the first information processing apparatus to transmit the maintenance signals to the relay server at the first sending interval;

determining the connection with the relay server is cut off;

determining a connection duration of the connection with the relay server based on a current time at which the connection with the relay server is cut off;

calculating a second sending interval to transmit the maintenance signals to the relay server, wherein the calculation of the second sending interval is based on the connection duration of the connection with the relay server, and the calculated second sending interval is less than or equal to the connection duration of the connection with the relay server;

controlling the communication unit to transmit the maintenance signals to the relay server at the second sending interval, controlling the communication unit to periodically receive reconnection information from the relay server, wherein the periodic reception of the reconnection information is based on the transmission of the maintenance signals at the second sending interval and the cut off of the connection between the first information processing apparatus and the relay server, the reconnection information is related to a time at which the first information processing apparatus reconnects to the relay server, the reconnection information is based on a number of a plurality of information processing apparatuses connected to the relay server, the plurality of information processing apparatuses includes the first information processing apparatus, and the reconnection information indicates a maximum waiting time between the cut off of the connection and the reconnection to the relay server;

controlling a storage unit of the first information processing apparatus to store reconnection setting information that is latest among the periodically received reconnection information;

determining a waiting time within the maximum waiting time based on a random number; and controlling the communication unit to reconnect to the relay server based on the waiting time that has passed, the stored reconnection setting information, and the cut off of the connection between the first information processing apparatus and the relay server.

10. The first information processing apparatus according to claim 1, wherein the first communication environment information includes a communication environment type that determines the communication environment, and the communication environment includes an IP address and model information of the communication relay apparatus.

11. The first information processing apparatus according to claim 1, wherein the controller is further configured to determine the connection with the relay server is cut off, based on connection status change information generated at the first information processing apparatus, and the connection status change information indicates a change in connection status of the connection with the relay server.

* * * * *